United States Patent
Bock

(10) Patent No.: US 10,800,688 B2
(45) Date of Patent: Oct. 13, 2020

(54) CONTROLLING DIGESTER BIOSOLIDS AND WASTEWATER ACTIVATED SLUDGE SYSTEMS

(71) Applicant: Aquaconeer, LLC, Panama City Beach, FL (US)

(72) Inventor: Albert Bock, Panama City Beach, FL (US)

(73) Assignee: Aquaconeer, LLC, Panama City Beach, FL (US)

( * ) Notice: Subject to any disclaimer, the term of this patent is extended or adjusted under 35 U.S.C. 154(b) by 0 days.

(21) Appl. No.: 16/454,235

(22) Filed: Jun. 27, 2019

(65) Prior Publication Data

US 2020/0002202 A1    Jan. 2, 2020

Related U.S. Application Data

(60) Provisional application No. 62/692,733, filed on Jun. 30, 2018.

(51) Int. Cl.
*C02F 3/30* (2006.01)
*C02F 11/06* (2006.01)
(Continued)

(52) U.S. Cl.
CPC ............ *C02F 3/308* (2013.01); *C02F 3/121* (2013.01); *C02F 3/303* (2013.01); *C02F 11/06* (2013.01); *C02F 2101/105* (2013.01); *C02F 2101/16* (2013.01); *C02F 2203/006* (2013.01); *C02F 2209/003* (2013.01); *C02F 2209/10* (2013.01)

(58) Field of Classification Search
CPC .......... C02F 3/308; C02F 3/121; C02F 11/06; C02F 3/303; C02F 2209/003; C02F 2209/10; C02F 2101/16; C02F 2101/105; C02F 2203/006; C02F 3/006; C02F 3/1263; C02F 11/121; C02F 2209/11; C02F 2209/055; C02F 2209/05; C02F 2209/006
USPC ........ 210/605, 614, 620, 630, 143, 903, 906, 210/908
See application file for complete search history.

(56) References Cited

U.S. PATENT DOCUMENTS 3,964,998 A     6/1976  Barnard
5,582,734 A *  12/1996  Coleman .................. C02F 3/006
                                                                210/614
(Continued)

OTHER PUBLICATIONS

File history of U.S. Pat. No. 10,294,134.
(Continued)

*Primary Examiner* — Fred Prince
(74) *Attorney, Agent, or Firm* — Thomas | Horstemeyer LLP

(57) ABSTRACT

Disclosed are various embodiments for measuring ionic activity by quantifying total dissolved solids (TDS) concentration in wastewater. In some embodiments, ionic activity of wastewater is monitored by quantifying the total dissolved solids concentration, which can be used for determining the ammonia reduction progress through nitrification and the luxurious phosphorous uptake process reaction and/or the reaction progress of soluble phosphorous species and reactive ions, including one or more alkali and alkaline-earth species and/or soluble metals species, to form non-soluble ionic phosphorous precipitate during biological activated wastewater processes and digester biosolids treatment processes.

20 Claims, 6 Drawing Sheets

(51) Int. Cl.
*C02F 3/12* (2006.01)
*C02F 101/10* (2006.01)
*C02F 101/16* (2006.01)

(56) References Cited

U.S. PATENT DOCUMENTS

| | | | |
|---|---|---|---|
| 5,733,456 A * | 3/1998 | Okey | C02F 3/006 |
| | | | 210/195.1 |
| 6,168,692 B1 * | 1/2001 | Sakai | C02F 1/46104 |
| | | | 204/228.1 |
| 7,416,669 B1 | 8/2008 | Carolan et al. | |
| 10,294,134 B2 | 5/2019 | Bock et al. | |
| 2006/0086662 A1 | 4/2006 | Ogden | |
| 2007/0175823 A1 | 8/2007 | Cheuk et al. | |
| 2010/0282654 A1 | 11/2010 | Hauschild | |
| 2012/0085704 A1 * | 4/2012 | Jenkins | C02F 3/302 |
| | | | 210/614 |
| 2013/0134092 A1 | 5/2013 | Mussari et al. | |
| 2014/0000346 A1 * | 1/2014 | Hoek | B01D 65/10 |
| | | | 73/38 |
| 2018/0118594 A1 | 5/2018 | Ghylin et al. | |

OTHER PUBLICATIONS

Charlie L.; et al (2017) "Traditional Nitrogen Removal Coupled with SND to Meet Advanced WWTP Standards at a Full Scale SBR Wastewater Treatment Facility" Journal of Water Research and Protection vol. 9 . No. 10.

S. Banjade (2008) "Anaerobic / Aerobic Digestion for Enhanced Solids and Nitrogen Removal" Virginia Tech.

B.W. Atkinson; et al (2000) "Anoxic Phosphate Uptake in a Continuous Enhanced Biological Phosphorus Removal Activated Sludge System" WISA 2000 Biennial Conference, Sun City, South Africa.

J. Tang; et al (2017) "Nitrogen Removal From Municipal Wastewater Using a Two-Sludge Denitrification/Nitrification Batch Reactor Performance and Mechanisms" Publication Clean Air Soil Water vol. 45.

* cited by examiner

| Column 1 | Column 2 | Column 3 | Column 4 | Column 5 | Column 6 | Column 7 |
|---|---|---|---|---|---|---|
| Aeration Time (hours) | TDS (mg/L) | Δ TDS (mg/L) | P (mg/L) | Δ P (mg/L) | $NH_3$ (mg/L) | Δ $NH_3$ (mg/L) |
| 0 | 1279 | N/A | 182 | N/A | 40 | N/A |
| 1 | 1145 | -134 | 80 | -102 | 40 | 0 |
| 2 | 1091 | -54 | 38 | -42 | 40 | 0 |
| 3 | 1056 | -35 | 27 | -11 | 38 | -2 |
| 4 | 1021 | -35 | 25 | -2 | 36 | -2 |
| 5 | 1004 | -17 | 25 | 0 | 33 | -3 |
| 6 | 987 | -17 | 25 | 0 | 29 | -4 |
| 7 | 966 | -21 | 25 | 0 | 23 | -6 |
| 8 | 944 | -22 | 25 | 0 | 18 | -5 |
| 9 | 926 | -18 | 25 | 0 | 13 | -5 |
| 10 | 914 | -12 | 25 | 0 | 10 | -3 |
| 11 | 904 | -10 | 25 | 0 | 7 | -3 |
| 12 | 899 | -5 | 25 | 0 | 4 | -3 |
| 13 | 889 | -10 | 25 | 0 | 1 | -3 |
| 14 | 885 | -4 | 25 | 0 | 0 | -1 |
| 15 | 885 | 0 | 25 | 0 | 0 | 0 |

*FIG. 4*

| Column 1 | Column 2 | Column 3 | Column 4 | Column 5 |
|---|---|---|---|---|
| Aeration Time (hours) | TDS (mg/L) | Δ TDS (mg/L) | P (mg/L) | Δ P (mg/L) |
| 0 | 643 | N/A | 68 | N/A |
| 1 | 507 | -136 | 34 | -34 |
| 2 | 448 | -59 | 15.6 | -18.4 |
| 3 | 423 | -25 | 10 | -5.6 |
| 4 | 418 | -5 | 8 | -2 |

*FIG. 5*

| Column 1 | Column 2 | Column 3 | Column 4 | Column 5 |
|---|---|---|---|---|
| Aeration Time (hours) | Calcium Concentration (mg/L) | Δ Calcium Concentration (mg/L) | P (mg/L) | Δ P (mg/L) |
| 0 | 380 | N/A | 75 | N/A |
| 1 | 260 | -120 | 52 | -23 |
| 2 | 150 | -110 | 30 | -22 |
| 3 | 80 | -70 | 17 | -13 |
| 4 | 50 | -30 | 13 | -4 |
| 5 | 34 | -16 | 10.5 | -2.5 |

*FIG. 6*

| Column 1 Time (hours) | Column 2 TDS (mg/L) | Column 3 Δ TDS (mg/L) | Column 4 P (mg/L) | Column 5 Δ P (mg/L) | Column 6 NH₃ (mg/L) | Column 7 Δ NH₃ (mg/L) | Column 8 TDS Slope (mg/L/hour) | Column 9 P Slope (mg/L/hour) | Column 10 NH₃ Slope (mg/L/hour) |
|---|---|---|---|---|---|---|---|---|---|
| 0 | 490 | N | 5 | N/A | 8 | N/A | N/A | N/A | N/A |
| 0.5 | 442 | -48 | 4 | -1 | 8 | 0 | -96.0 | -2.0 | 0.0 |
| 1 | 391 | -51 | 3 | -1 | 7 | -1 | -102.0 | -2.0 | -2.0 |
| 1.5 | 340 | -51 | 2 | -1 | 5 | -2 | -102.0 | -2.0 | -4.0 |
| 2 | 290 | -50 | 1 | -1 | 4 | -1 | -100.0 | -2.0 | -2.0 |
| 2.5 | 275 | -15 | 0.9 | -0.1 | 3 | -1 | -30.0 | -0.2 | -2.0 |
| 3 | 261 | -14 | 1.1 | 0.2 | 1 | -2 | -28.0 | 0.4 | -4.0 |
| 3.5 | 260 | -1 | 1 | -0.1 | 0.1 | -0.9 | -2.0 | -0.2 | -1.8 |
| 4 | 275 | 15 | 1.1 | 0.1 | 0.1 | 0 | 30.0 | 0.2 | 0.0 |
| 4.5 | 291 | 16 | 1.1 | 0 | 0.2 | 0.1 | 32.0 | 0.0 | 0.2 |

*FIG. 7*

CONTROLLING DIGESTER BIOSOLIDS AND WASTEWATER ACTIVATED SLUDGE SYSTEMS

CROSS-REFERENCE TO RELATED APPLICATIONS

This application claims the benefit of and priority to U.S. Provisional Patent Application No. 62/692,733 entitled "METHODS FOR CONTROLLING DIGESTER BIOSOLIDS AND WASTEWATER ACTIVATED SLUDGE SYSTEMS," filed Jun. 30, 2018, the contents of which being incorporated by reference in their entirety herein. This application is also related to U.S. patent application Ser. No. 14/734,753 entitled "SYSTEMS AND METHODS FOR ENHANCED FACULTATIVE BIOSOLIDS STABILIZATION," now issued as U.S. Pat. No. 10,294,134 B2, the contents of which being incorporated by reference in their entirety herein.

FIELD OF THE INVENTION

The present disclosure relates to monitoring of a wastewater activated sludge or digester biosolids treatment process for biological wastewater treatment plants by controlling oxygenation stages. This allows for optimization of the reduction of soluble phosphorus and total nitrogen species in the activated sludge process effluent and reduce the soluble phosphorus and total nitrogen in recycled waters (side streams) of the digester biosolids treatment process, as well as to reduce the digester biosolids organic solids contents and reduce energy requirements for oxygenation and chemical requirements for phosphorous removal.

BACKGROUND

Wastewater needs to be treated to reduce environmental impact on receiving water bodies and estuaries. The treatment of wastewater includes the removal of pollutants such as heavy metals, nitrogen, phosphorous, and organic compounds. The removal of wastewater pollutants, like phosphorous and nitrogen, presents operational challenges for personnel at treatment plants. Pollutants that are treated in wastewater treatment plants include, but are not limited to, phosphorous, nitrogen, and carbon.

Despite years of development, phosphorous and nitrogen removal from wastewater treatment systems remains problematic. For instance, the removal of phosphorus from wastewater is expensive and time consuming during a wastewater activated sludge process and a digester biosolids treatment process, and is usually achieved through adding chemical coagulants and/or precipitating agents to the wastewater.

BRIEF SUMMARY OF INVENTION

According to various embodiments, a system is described comprising at least one sensor or nutrient analyzer configured to obtain at least one measurement from wastewater and a controller. In some embodiments, the controller is configured to determine a calculated slope progress of ionic activity of the wastewater as a function of treatment duration time using the at least one measurement obtained by the at least one sensor or nutrient analyzer, and perform a wastewater treatment process based at least in part on the calculated slope progress of the ionic activity of the wastewater.

The wastewater may include at least one of: influent wastewater, waste activated sludge, primary sludge, and septage, and the wastewater may contain at least one pollutant, the at least one pollutant comprising at least one of: soluble or insoluble phosphorous species, soluble or insoluble nitrogen species, soluble, or insoluble carbon species. In some embodiments, the wastewater treatment process may include at least one of: aerobic, anaerobic, and anoxic treatment.

The slope progress of ionic activity may be determined by the controller as a function of at least one of: a rolling average, a standard deviation, a slope, global maxima, global minima, local maxima, and local minima. The controller may be further configured to determine a duration of an aerobic oxygenation period and an amount of oxygenation to be performed in the wastewater treatment process using the slope progress of the ionic activity, the wastewater treatment process comprising an aerobic treatment phase.

In some embodiments, the slope progress of the ionic activity may be used by the controller to determine a pollutant reduction reaction progress and an end point for at least one of: a. soluble ammonia species reduction by a nitrification process; b. soluble phosphorous species reduction by a luxurious phosphorus uptake process; and c. soluble phosphorous species reduction by an earth mineral phosphorous precipitation process.

The controller may be further configured to determine, by monitoring the slope progress of a time resolved plot of the ionic activity as a function of treatment duration time, at least one of: the pollutant reduction reaction progress and the end point of the nitrogen species pollutants by the nitrification process; the pollutant reduction reaction progress and the end point of the phosphorous species pollutants by the luxurious phosphorus uptake process; and the pollutant reduction reaction progress and the end point of the phosphorous species pollutants by earth mineral phosphorous precipitation process with reactive ions, the earth mineral phosphorous precipitation process comprising an alkali species, an alkaline-earth species, and a soluble metals species process.

Further, in some embodiments, the slope progress of ionic activity measured through at least one earth mineral measurement directly. In some embodiments, the slope progress of ionic activity is measured through at least one of: a total dissolved solids (TDS) concentration, a conductivity measurement; a salinity measurement; a water resistance measurement; a water hardness measurement; a light absorbance measurement; and a transmittance measurement.

According to various embodiments, a method is described, comprising controlling a wastewater treatment process by directly or indirectly monitoring a calculated slope progress of an ionic activity of wastewater as a function of treatment duration time.

The wastewater may include at least one of: influent wastewater, waste activated sludge, primary sludge, and septage, and the wastewater may contain at least one pollutant, the at least one pollutant comprising at least one of: soluble or insoluble phosphorous species, soluble or insoluble nitrogen species, soluble, or insoluble carbon species. In some embodiments, the wastewater treatment process may include at least one of: aerobic, anaerobic, and anoxic treatment.

The slope progress of ionic activity may be determined as a function of at least one of: a rolling average, a standard deviation, a slope, global maxima, global minima, local maxima, and local minima. The method may further include determining a duration of an aerobic oxygenation period and an amount of oxygenation to be performed in the wastewater treatment process using the slope progress of the ionic activity, the wastewater treatment process comprising an aerobic treatment phase.

In some embodiments, the slope progress of the ionic activity may be used to determine a pollutant reduction reaction progress and an end point for at least one of: a. soluble ammonia species reduction by a nitrification process; b. soluble phosphorous species reduction by a luxurious phosphorus uptake process; and c. soluble phosphorous species reduction by an earth mineral phosphorous precipitation process.

The method may further include determining, by monitoring the slope progress of a time resolved plot of the ionic activity as a function of treatment duration time, at least one of: the pollutant reduction reaction progress and the end point of the nitrogen species pollutants by the nitrification process; the pollutant reduction reaction progress and the end point of the phosphorous species pollutants by the luxurious phosphorus uptake process; and the pollutant reduction reaction progress and the end point of the phosphorous species pollutants by earth mineral phosphorous precipitation process with reactive ions, the earth mineral phosphorous precipitation process comprising an alkali species, an alkaline-earth species, and a soluble metals species process.

Further, in some embodiments, the slope progress of ionic activity is measured through at least one earth mineral measurement. In some embodiments, the slope progress of ionic activity is measured through at least one of: a total dissolved solids (TDS) concentration measurement, a conductivity measurement; a salinity measurement; a water resistance measurement; a water hardness measurement; a light absorbance measurement; and a transmittance measurement.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a diagram illustrating ammonia reduction through nitrification processes and soluble phosphorous species reaction progress and/or soluble phosphorous species reaction end point in the aerobic phase of a fluctuating anaerobic-aerobic digester biosolids treatment process in flow-through and/or sequential batch type operation, by monitoring the digester biosolids ionic activity through observation of the slope of the TDS concentration as a function of aerobic phase treatment time according to various embodiments of the present disclosure.

FIG. 5 is a method for determining soluble phosphorous species reaction progress and/or soluble phosphorous species reaction end point in the aerobic phase of a fluctuating anaerobic-aerobic digester biosolids treatment process in a flow-through and/or a sequencing batch reactor (SBR)-type operation, which includes measuring and monitoring the digester biosolids ionic activity through observation of the slope of the TDS concentration as a function of aerobic phase treatment time according to various embodiments of the present disclosure.

FIG. 6 is a drawing shown an example of the soluble phosphorous species reaction progress and/or soluble phosphorous species reaction end point in the aerobic phase of a fluctuating anaerobic-aerobic digester biosolids treatment process in a flow-through and/or SBR type operation by using the calcium slope calculations as a function of treatment cycle duration time according to various embodiments of the present disclosure.

FIG. 7 is a drawing describing an example of determining ammonia reduction through nitrification and the soluble phosphorous species reaction progress and/or soluble phosphorous species reaction end point in the wastewater activated sludge SBR by monitoring the slope progress of the TDS concentration measurements as a function of treatment cycle duration according to various embodiments of the present disclosure.

DETAILED DESCRIPTION

Figure 1:
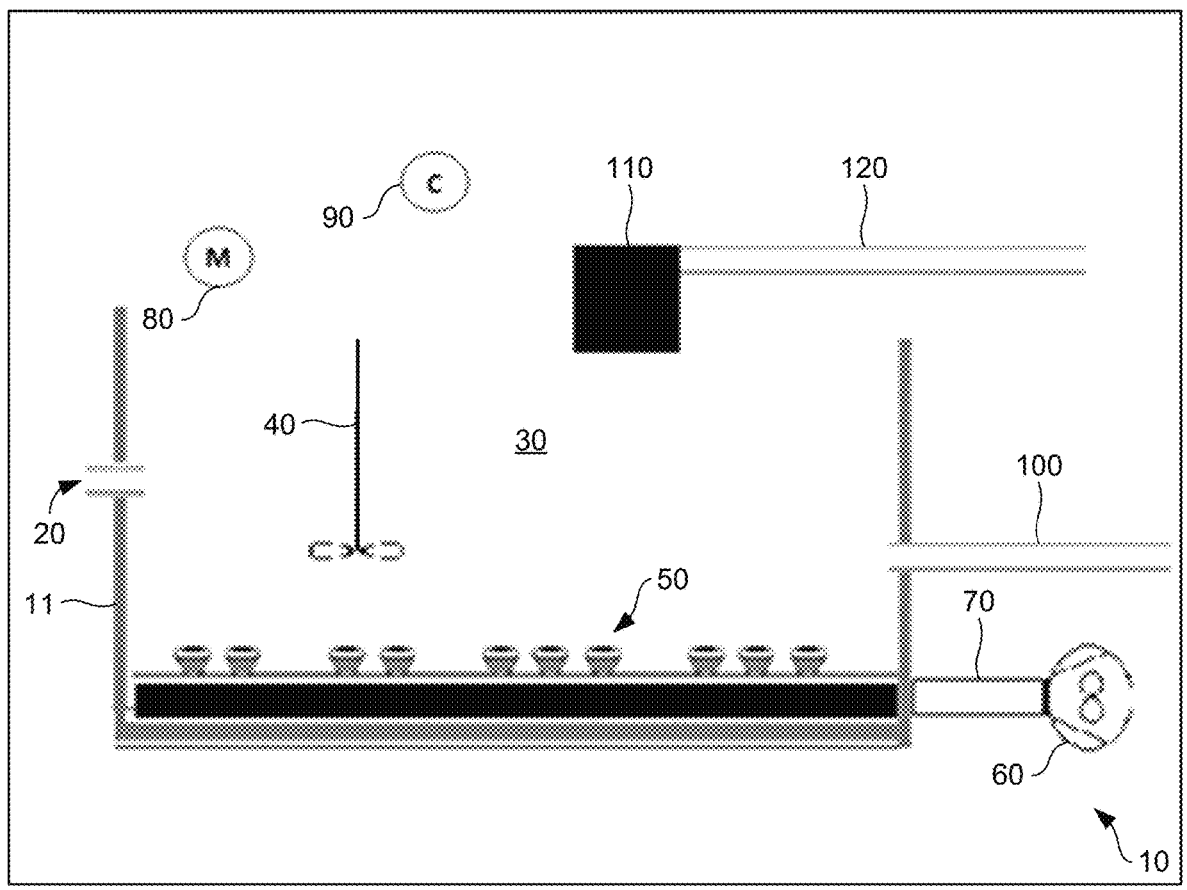
FIG. 1 is a diagram that describes an activated sludge process executed in a sequencing batch according to various embodiments of the present disclosure.

The invention can best be illustrated with references to the accompanying drawings and embodiment variations described in the below figures. While the figures and descriptions of the current invention show a working system, it should be recognized that the invention is not intended to be limited to the embodiments illustrated in the drawings and the embodiments provided here are intended to provide examples of embodiments that could be used to create working systems using the current invention. The invention includes all alternatives, modifications, and equivalents that may be included within the scope and spirit of the invention.

The average pollutant concentrations in domestic wastewater can range based on the type of collection system, seasonal conditions, and the detention time in the collection system. Typically, expected ranges of pollutant concentrations normal influent flows are shown in Table 1 below.

TABLE 1

| Pollutant | Concentration |
| --- | --- |
| Carbon | 50-400 mg/L |
| Phosphorous | 3-11 mg/L |
| Nitrogen | 15-80 mg/L |

Expensive real-time monitoring equipment is currently required to measure and optimize the removal process of phosphorous and nitrogen.

In biological wastewater treatment processes, phosphorous is removed and extracted from the liquid wastewater phase through biological uptake, as well as adding chemical coagulants and/or precipitating agents. These coagulants and/or precipitation agents form insoluble compounds which then adsorb onto wastewater biosolids.

Phosphorous compounds are removed from the activated sludge during the digester treatment process by methods that include absorption and/or adsorption to the sludge flock. Absorption describes the phosphorous compounds that are biologically up taken by microorganisms and absorbed to the sludge flock. Adsorption takes place through precipitation processes due to the addition of chemical coagulants and/or precipitating agents, and/or through a process called earth mineral phosphorous precipitation that takes place due to the cycling between anaerobic, aerobic, and alternatively anoxic treatment environments.

The absorbed and/or adsorbed phosphorous species are removed from the wastewater activated sludge system through sludge wasting, and then transferred to the biosolids digestion process. Digester biosolids treatment processes remove absorbed and/or adsorbed phosphorous species from the system through sludge dewatering and sludge hauling. The concentration of nitrogen species in biological activated sludge and digester biosolids treatment processes is reduced through nitrification and denitrification processes. Nitrification is the process of reducing ammonia by oxidative nitrification of the ammonium, first to nitrites ($NO_2$—), and then to nitrates ($NO_3$—).

Denitrification is a process conducted under anoxic conditions where only chemically bound oxygen and soluble carbon is available for respiration of facultative microorganisms (no dissolved oxygen is present under anoxic conditions as there is under aerobic conditions). Anoxic reductive denitrification is a process of nitrogen conversion of the nitrates produced in the oxidative aerobic cycle which first produces nitrogen dioxide ($NO_2$), converts the $NO_2$ to nitric oxide (NO), then converts the NO to nitrous oxide ($N_2O$), and eventually into a harmless nitrogen gas ($N_2$).

Some activated sludge and digester biosolids treatment process systems achieve denitrification also under aerobic conditions, which is called simultaneous nitrification and denitrification (SND). In such systems, the rate of oxygenation is maintained at a lower state than usual aeration rates in activated sludge or digester biosolids treatment processes, such that nitrification and denitrification can occur simultaneously or at the same time. This occurs due to the reduced aeration rate oxidizing less of the soluble carbon, which then becomes available for denitrification processes from the nitrates that are formed through the oxidation of ammonia.

There are several wastewater activated sludge processes and digester biosolids treatment processes that are able to remove pollutants, such as phosphorous and nitrogen. The pollutant removal of soluble phosphorous and nitrogen takes place during the biological treatment cycle of the wastewater activated sludge process and during the digester biosolids treatment process. Examples for the wastewater activated sludge processes include Sequencing Batch Reactors (SBR) as described in U.S. Patent Application No. 2007/0175823 to William Cheuk, the conventional activated sludge process, and the five stage Bardenpho process described in U.S. Pat. No. 3,964,998 to James Laing Barnard. Examples for digester biosolids treatment processes include the facultative digestion process, as described in U.S. Pat. No. 10,294,134 to Albert Bock, and the in-series operation of anaerobic processing followed by aerobic digestion processing.

Wastewater activated sludge processes and digester biosolids treatment process systems achieve removal of pollutants by alternating oxygenation and mixing of the wastewater to generate anaerobic, anoxic, and/or aerobic conditions. Oxygenation of the wastewater is typically achieved by aeration equipment to generate the aerobic conditions. Biological wastewater activated sludge treatment processes and digester biosolids treatment processes rely on aerobic, anaerobic, and anoxic cycling, as well as the microorganisms that can live in such environments. Aerobic microorganisms prefer oxic conditions where there is a presence of dissolved oxygen, whereas anaerobic microorganisms are predominantly present under anaerobic conditions, where there is an absence of dissolved oxygen. Another culture of microorganisms are facultative anoxic microorganisms, which live and respire under anaerobic, aerobic, and anoxic conditions.

The procedure of anaerobic-aerobic-anoxic cycling is known to be a key factor for optimizing phosphorous and pollutant removal. Anaerobic-aerobic-anoxic cycling is the changing of treatment environments and conditions based on oxygen concentration and other factors influencing anaerobic, aerobic, and anoxic states of the wastewater and can follow in various configuration patterns not limited to any certain sequential or time-specific order. Anaerobic, aerobic, and anoxic wastewater states can be organized in other various and more complex strategies to achieve optimal phosphorous, nitrogen, and other pollutant removal.

Notably, it is understood that aerobic conditions may be present when a significant amount of dissolved oxygen concentration is present in the wastewater. On the other hand, anoxic conditions occur when the level of dissolved oxygen is greater than 0 mg/L but and less than 0.3 mg/L, concurrently with one or more nitrogen oxide species in concentrations greater than 0 mg/L. Also, anaerobic conditions are present when the level of dissolved oxygen is 0 mg/L simultaneously with one or more nitrogen oxide species at 0 mg/L concentration.

The cycling between anaerobic, aerobic and alternatively anoxic treatment environments generates conditions that promote the biological removal of phosphorus and nitrogen compounds. Phosphorous is consumed and absorbed by microorganisms present in the sludge flock through the cycling of anaerobic, aerobic, and, alternatively, anoxic conditions, and then removed from the activated sludge process system through sludge wasting. This process is referred to as luxurious phosphorous uptake or biological phosphorous uptake process (or "bio-P uptake").

In some digester biosolids treatment process systems, the luxurious phosphorous uptake process is inhibited partly or completely due to long anaerobic treatment phases that result in a decrease of the microbiological population responsible for the absorption of soluble phosphorous species. In digester biosolids treatment systems having long anaerobic treatment phases (typically anaerobic treatment times exceeding 24 hours), the majority or all of the removal of soluble phosphorous species during anaerobic-aerobic-anoxic cycling is due to another reaction process referred to as earth mineral phosphorous precipitation. The earth mineral phosphorous precipitation reaction is enabled by a shift in the pH of the wastewater during the aerobic phase due to extraction of carbon dioxide ($CO_2$) and air extractable organic acids, where the pH starts out as acidic (usually ranging between 5.5 to 6.8, or lower), and shifts to a pH that is more basic (usually ranging between 6.8 to 7.8, or higher).

Due to the fluctuations of the pH of the wastewater from acidic during the anaerobic phase to slightly alkaline during the aerobic phase, pollutants like phosphorus and heavy metals precipitate from a soluble compound state (during anaerobic conditions) to an insoluble compound state (during aerobic and anoxic conditions). The soluble phosphorous species are precipitated by forming insoluble compounds with other reactive ions present in the wastewater activated sludge or digester biosolids. Some precipitated compounds have the potential to become soluble again under anoxic and anaerobic conditions. For example, if the concentration of one or more nitrogen oxide ion compounds falls below 0.5 mg/L which generates organic acid and/or $CO_2$ species. This can shift the pH back into acidic ranges.

Aerobic conditions can also lead to the solvation of previously precipitated compounds if the pH of the wastewater becomes acidic, for example, due to the formation of hydrogen ions from nitrification process reactions. The precipitation reactions of phosphorous species during anaerobic-aerobic-anoxic cycling is driven by soluble reactive alkali and/or alkaline-earth species and/or soluble metals that are present in the wastewater activated sludge mixture and digester biosolids sludge mixture. This precipitation reaction process is referred to as earth mineral phosphorous precipitation.

The phosphorous removal through bio-P and/or earth mineral phosphorous precipitation accounts for the majority of phosphorus removal throughout the biological wastewater activated sludge processes and digester biosolids treatment process, which are differentiated from the chemical phosphorous removal process achieved through the addition of coagulants and/or precipitating agents to the treatment system.

To achieve enhanced removal of phosphorous, chemical coagulants and/or precipitating agents are added before, after, or during the biological wastewater activated sludge processes and/or digester biosolids treatment processes. The coagulant and/or precipitating agents used for chemical treatment could be a salt such as aluminum sulfate $Al_2(SO_4)_3$, iron sulfate $Fe_2(SO_4)_3$, and/or ionic rare earth metal compounds, such as cerium trichloride ($CeCl_3$). Other ionic metal compounds, such as iron chloride ($FeCl_3$), can also be used.

Adding chemicals for phosphorous removal is relatively expensive and leads to higher sludge volumes which must be disposed from the wastewater system. The more acidic nature of the wastewater due to the addition of chemical coagulants and/or precipitation agents with acidic characteristics also reduces the earth mineral phosphorous precipitation process. Notably, the earth mineral phosphorous precipitation process is impacted by the added chemical coagulants and/or precipitation agents with acidic characteristics because the reactive alkali and alkaline-earth species are neutralized by reactions with the acidic species (including the metal compounds) and are no longer available for the precipitation reaction with phosphorous.

According to various embodiments described herein, a process control method and system are described that reduce the nitrogen species concentration of the activated sludge and digester treatment process through nitrification processes and/or, reduces the need for the addition of chemical coagulants and/or precipitation agents to promote the phosphorous removal process of the activated sludge and digester treatment process, and, instead, allows for the reduction of the phosphorous concentration by the luxurious phosphorous removal and earth mineral phosphorous precipitation processes.

For wastewater activated sludge processes, like the SBR process, soluble alkali, alkaline-earth species, and/or soluble metals form insoluble precipitation compounds with soluble phosphorous during fluctuating anaerobic, aerobic, and anoxic treatment stages. The insoluble phosphorous precipitation products are adsorbed onto the biosolids and additional soluble phosphorous is consumed by microorganisms and absorbed by the sludge flock. The absorbed and/or adsorbed phosphorous species are removed from the system via sludge wasting and treated in the digester biosolids treatment process for later disposal. Once the activated sludge process is completed, the flocculated matter is treated in subsequent steps to separate the solids from the liquid fraction by sedimentation and followed by filtration. The extracted solid fraction is then returned to the head of the wastewater activated sludge process and the liquid fraction is treated further downstream in sequential process steps.

The treated liquid fraction coming from the wastewater activated sludge process has reduced pollutant concentrations for phosphorous, nitrogen, and carbon. A chemical treatment phase may be added before, during, or after the biological treatment phase of the activated sludge process to further reduce the soluble phosphorous concentration.

In digester biosolids treatment processes that include anaerobic, aerobic, and anoxic cycling, organic compounds and aerobic microbes are broken down by facultative microorganisms through digestions of the organic fraction and cell mass of the of the waste activated sludge content. For digester biosolids treatment processes that include anaerobic, aerobic, and anoxic cycling, soluble phosphorous species are reduced through luxurious phosphorous uptake and/or through the reaction process with alkali and/or alkaline-earth species and/or soluble metals to form non-soluble precipitation compounds. The absorbed and/or adsorbed phosphorous compounds become part of the digester biosolids flock and are removed from the system through the biosolids dewatering process or sludge hauling process.

The treatment time of the anaerobic digester treatment cycle can be adjusted to achieve different levels of treatment to achieve different levels of organic biosolids reduction results. Longer treatment cycle times of the anaerobic stage achieve more reduction in the concentration of organic solids. Another way to enhance the reduction of organic solids content includes repeating a sequence between the anaerobic, aerobic, and anoxic digester treatment cycles multiple times.

If the treated digester biosolids are to be applied as fertilizer to soil in the United States, and not disposed of in a landfill, the biosolids are subject to regulations promulgated by the United States Environmental Protection Agency as set forth in Volume 40 of the Code of Federal Regulations (CFR) § 503, which are often referred to as "Class B biosolids standards." Class B biosolids standards require minimum reductions in "vector attraction" and "pathogens." Pathogen reduction means that the biosolids are without significant coliform pathogens, as defined by the CFR, which can be determined through a fecal coliform test.

Reducing vector attraction means that the biosolids are not attractive to rodents, mosquitoes, and/or other vectors for disease transmission. There are various different traditional test methods for determining the degree of reduction in vector attraction. One test for determining vector attraction reduction measures a parameter called "specific oxygen uptake reduction," known by the acronym "SOUR." Other countries or municipalities outside the United States may impose similar or related minimum requirements for surface disposal of stabilized biosolids, with some individual local municipalities imposing more stringent conditions. For instance, some jurisdictions require additional nutrient requirements and/or a limit on the organic biosolids content to satisfy local, state, or federal regulations.

Very specific oxygenation is required to optimize the pollutant removal of phosphorous and nitrogen during the biological wastewater activated sludge and the digester biosolids treatment processes. The specific timing of the introduction of a quantified amount of oxygen at a controlled flow rate is required throughout all time determined stages to optimize the anaerobic-aerobic-anoxic cycling.

Excess oxygenation tends to lower the pH of the activated sludge and digester biosolids which produces high levels of soluble phosphorous and nitrogen species. Conversely, insufficient oxygenation periods result in incomplete earth mineral phosphorous precipitation, incomplete bio P-uptake, and incomplete nitrogen removal. Both excess oxygenation and insufficient oxygenation results in increased soluble phosphorous and/or nitrogen concentrations which lower the wastewater treatment efficiency and demand more intensive chemical treatments to meet effluent pollutant discharge limit requirements.

The present disclosure provides a precise system and method for real-time process measuring, monitoring, and control that optimizes the oxygenation stages of the biological wastewater treatment process. This results in the ability to achieve optimal phosphorous and nitrogen removal in the biological activated wastewater treatment and digester biosolids treatment processes, while reducing the energy consumption for oxygenation. The present disclosure also allows the ability to achieve optimal results for the removal of soluble phosphorous species while reducing the costs for chemical coagulants and/or precipitation agents for soluble phosphorous reduction.

The final result of various embodiments of the present disclosure includes a reduction of the organic solids content in the digester biosolids treatment process, which produces a product for disposal that is reduced in organic mass and volume with associated reduced sludge disposal and hauling costs.

The embodiments described herein control oxygenation phases of wastewater activated sludge and digester treatment processes by determining several factors including, but not limited to, nitrification reaction progress and end point, luxurious phosphorous uptake, precipitation reaction progress, and end point between soluble phosphorous species and reactive ions, including one or more alkali and/or alkaline-earth species and/or soluble metals. These embodiments enable real-time monitoring and analysis of the measured wastewater activated sludge or digester biosolids ionic activity by implementation of any methods for quantifying total dissolved solids (TDS) concentration, or other measurement. Many solution properties are directly and indirectly related to the TDS concentration, such as conductivity, ionic activity, salinity and other properties based on the soluble species concentrations.

It is understood that the nitrification reaction progress, luxurious phosphorous uptake progress, and reaction progress of the soluble phosphorous species with reactive ions, including one or more alkali and/or alkaline-earth species and/or soluble metals species during the wastewater activated sludge process and digester biosolids treatment process, is in direct correlation to the medium's ionic activity as measured by TDS concentration.

Ionic activity (also known as ionic strength) combines the measure of the total concentration of ions in the solution and refers to the concentration and reactivity of all ionic compounds and species in aqueous wastewater activated sludge and/or digester biosolids. In various embodiments, the ionic activity of wastewater activated sludge or digester biosolids can be measured directly and/or indirectly by several methods including one or more measurements of TDS concentration, water resistance/resistivity, water salinity, water conductivity and/or through optical methods including spectrochemistry. These measurements can be obtained by one or more sensors or measuring devices, as may be appreciated.

The ionic activity identifies all the dissociated electrolytes that contribute to salinity concentrations and other compounds such as dissolved organic matter in wastewater activated sludge and/or digester biosolids. These include cations of all the alkali and alkaline earth metals in the s-block of the periodic table, such as sodium, magnesium, and calcium. These cations react with polyatomic anion counterparts which are defined as all species formed by the varying valence & bonding of elements in the p-block of the periodic table such as nitrogen, phosphorous, and sulfur. Some examples of such polyatomic anions include ammonia, nitrites, nitrates, phosphates, sulfites and sulfates, as well as monatomic anions such as nitrides, phosphides, and sulfides. Reactions of these polyatomic anions with other metal cations, such as iron, can also contribute to the overall ionic activity of wastewater activated sludge and/or digester biosolids.

In some instances of quantifying ionic activity (for example by measuring the TDS concentration), one or more compensation methods are required to properly determine the reaction progress and end point of the nitrification processes, soluble phosphorous reduction through luxurious phosphorous uptake, and the precipitation reaction progress and end point between soluble phosphorous species and reactive ions, including one or more alkali and/or alkaline-earth species and/or soluble metals.

In an embodiment of the present disclosure, a determination of whether a compensation method is needed can be made at any stage of the reaction process. Then, that compensation method can be calculated and applied where determined by a controller. The controller can include a computing device, such as one having memory and at least one hardware processor. Alternatively, the controller can include processing circuitry, such as a integrated circuit (IC) or a programmable microcontroller device.

Compensation methods are needed if ion species concentration or reactivity are changed or affected significantly enough to impact the measurements of the ionic activity of the entire bulk sample of wastewater activated sludge and/or digester biosolids. These changes to ionic species concentration and/or reactivity are not always related to the reaction processes of ammonia reduction and/or soluble phosphorous reduction to form non-soluble phosphorous precipitate species.

For example, soluble ionic species that are extractable by air can change the ionic activity by being extracted out of the wastewater activated sludge and/or digester biosolids medium during the beginning stages of the aeration phase. In this case, air extracted ionic species cause a resulting change in the medium's ionic activity at the beginning of the aeration phase until fully extracted from the liquid medium without taking part in any of the actual soluble phosphorous precipitation processes and/or ammonia reduction process.

Ionic species can be air extracted by several components of the air found in wastewater treatment processes and include, but are not limited to, carbon dioxide ($CO_2$) and hydrogen sulfide ($H_2S$). There are many other ionic compounds that change their ionic characteristics during a wastewater activated sludge and/or digester biosolids treatment process without taking part in soluble phosphorous removal and/or ammonia reduction. In such events, the interfering ion species have to be identified case-by-case to determine the proper use of one or more compensation methods. One method may include disqualifying TDS readings during the first hour or more of the aeration cycle until the air extractable ionic species are removed from the liquid medium.

There are a large variety of TDS measurement sensors, devices, and methods for wastewater applications that can measure the TDS directly and indirectly. In some embodiments, sensor probes and TDS analyzers include flow-through cells. Flow-through analyzers require that the sample medium from the wastewater system be transported to the analyzer.

The electrolytic water conductivity measurement of wastewater activated sludge and/or digester biosolids is the measurement of the medium passing electricity and is directly related to the concentration of ions present in wastewater activated sludge and/or digester biosolids. These conductive ions (often referred to as electrolytes) are directly related to the TDS concentration and come from dissolved organic compounds as well as salts and other inorganic materials including, but not limited to, phosphorous, alkali, and alkaline-earth species; heavy metals and other inorganic species; ammonia; chlorides; sulfides; etc.

There are many different methods and measuring devices to measure the electrical conductivity of wastewater activated sludge and/or digester biosolids directly and indirectly. One method to determine the electrical conductivity of wastewater activated sludge and digester biosolids is measured by determining the conductance of the solution between two electrodes separated by a fixed physical distance.

Examples for some apparatuses that may be used for measuring the wastewater conductivity include sensor probes and conductivity analyzers using a flow-through cell. Flow-through conductivity analyzers require transportation of the sample medium from the wastewater system to the analyzer.

The electrolytic water resistance measurement is also known as water resistivity and is a measurement of the wastewater activated sludge and/or digester biosolids mediums' resistance of passing electricity. This is directly related to the concentration of ions present in the wastewater activated sludge and/or digester biosolids. These conductive ions (often referred to as electrolytes) are directly related to the TDS concentration and come from dissolved organic compounds as well as salts and other inorganic materials including, but not limited to, phosphorous; alkali and alkaline-earth species; heavy metals and other inorganic species; ammonia; chlorides; sulfides, etc.

There are many different methods and measuring devices for measuring the wastewater activated sludge and digester biosolids electrical resistance directly and indirectly. One method to determine the wastewater activated sludge and/or digester biosolids electrical resistance includes determining the electrical resistance of the medium between two electrodes separated by a fixed physical distance. Examples for systems and apparatuses used for measuring the wastewater activated sludge and/or digester biosolids electrical resistance include sensor probes and resistance analyzers using a flow-through cell. Flow-through analyzers require transportation of the sample medium from the wastewater system to the analyzer.

The salinity measurement of wastewater activated sludge and/or digester biosolids is the measurement of the quantity of the dissolved salt content of the medium. Some examples of salts which dissolve into ions are compounds like ammonium sulfate, sodium chloride, magnesium sulfate, phosphorous, and sodium bicarbonate. The concentration of dissolved chloride ions is sometimes specifically referred to as chlorinity, but this does not describe the concentration of all kinds of salt dissolved in a given medium. Salinity can be expressed in the form of a mass fraction, e.g., the mass of the dissolved salts in a unit mass of solution.

There are many different methods and measuring devices that measure the wastewater activated sludge and/or digester biosolids salinity directly and indirectly. One way to measure salinity includes using a refractometer analyzer with a flow-through cell. A refractometer measures the change of direction or bending of the light as it passes from air to water.

The ionic activity of wastewater activated sludge and/or digester biosolids can also be determined through optical measuring devices that measure the light absorbance and/or transmittance of the filtered aqueous medium. There are many different optical based measuring devices available for light absorbance and/or transmittance analysis of water samples, such as a spectrophotometer, and other methods, such as fluorescent dye sensing.

Because the conductivity, water resistance, water salinity, and TDS concentration all have a strong correlation to each other and generally express the ionic activity of the medium, an alternative embodiment of this invention could instead monitor one or more properties that measure the ionic activity directly or indirectly, such as TDS concentration, conductivity, water resistance or water salinity, to empirically determine the TDS concentration instead of directly monitoring the TDS concentration.

In either case, this allows for determination of the nitrification progress reaction, the luxurious phosphorous uptake process reaction and the reaction of soluble reactive ions of one or more alkali and/or alkaline-earth species and/or one or more soluble metal compounds with soluble phosphorous species during the wastewater activated sludge process and/or biosolids digestion processes. This can also be achieved by combining measurements (such as conductivity, water resistance or water salinity) with any traditional wastewater activated sludge processes and/or digester biosolids processes monitoring parameters such ammonia, dissolved oxygen concentrations and/or oxygen reduction potential measurements to empirically determine the TDS concentration and/or the ionic activity.

The ionic activity of the liquid medium of the activated sludge and/or the digester treatment process is used to measure the reaction progress of soluble phosphorous reduction through the earth mineral phosphorous precipitation and/or the luxurious phosphorous uptake process as well as the nitrification reaction progress. Other mass fraction measurement methods can provide similar results and the embodiments described herein are not intended to be limited to any specific mass fraction method of measuring systems for ionic activity. Mass fraction measurements for ionic species quantification is suited to monitor the phosphorous and ammonia reduction processes of activated sludge and digester biosolids treatment processes.

The reaction progress and end point of ammonia reduction through nitrification, and the soluble phosphorous species reduction through luxurious phosphorous uptake process and/or earth mineral phosphorous precipitation during the aerobic oxygenation phase, may be achieved by monitoring one or more set points of the slope of a plot of TDS concentration as a function of treatment duration during the biological activated sludge and digester biosolids treatment processes. Other reactions of soluble phosphorous forming insoluble compounds, such as phosphorous inorganic matter complexes, can also impact the total phosphorous concentration in the wastewater activated sludge and/or digester biosolids and the embodiments described herein also provide for monitoring an overall effect of those reactions on the measurements of the total concentration of soluble phosphorous.

The luxurious phosphorous uptake and/or the earth mineral phosphorous precipitation process during the activated sludge wastewater treatment process and/or biosolids digestion process (to form insoluble phosphorous precipitate species) can be monitored by measuring one or more alkali and/or alkaline-earth species and/or soluble metal species directly (using, for example, soluble calcium or magnesium concentration), by monitoring the slope progress of the one or more alkali and/or alkaline-earth species and/or soluble metal species concentration.

Further embodiments include sensors and analyzers capable of testing for water hardness. There are many ways of measuring water hardness, and/or alkali and/or alkaline-earth species and/or metal species, directly and indirectly. One embodiment includes using a colorimeter or a spectrophotometer analyzer. The colorimeter or spectrophotometer analyzer typically uses a filtered wastewater activated sludge and/or digester biosolids sample and analyzes the concentration of water hardness and/or the alkali and/or alkaline-earth species and/or metal species. The quantification of water hardness and/or alkali and/or alkaline-earth species and/or metal species of wastewater activated sludge and/or digester biosolids can also be achieved by using sensor probes.

The reaction progress of the luxurious phosphorous uptake process and/or reaction end point of the earth mineral phosphorous precipitation process during the aerobic oxygenation phase is achieved by monitoring a set point for the slope of a plot of the measured water hardness and/or one or more alkali and/or alkaline-earth species and/or one or more soluble metal species concentration as a function of treatment duration. Other reactions of soluble phosphorous forming insoluble compounds, such as phosphorous inorganic matter complexes, could also impact the total phosphorous concentration in the wastewater and the embodiment of this invention would also be able to monitor the overall effect of those reactions on the measurements of the total concentration of soluble phosphorous.

An alternative embodiment of the invention could instead monitor parameters, such as water hardness and/or alkali and/or alkaline-earth species and/or one or more soluble metal species concentration by combining one or more traditional wastewater monitoring parameters such as measurements of ammonia and/or dissolved oxygen concentration, or oxygen reduction potential measurements to empirically determine the reaction progress of alkali and/or alkaline-earth species and/or soluble metal compounds with soluble phosphorous species during the wastewater activated sludge process or biosolids digestion process to form insoluble phosphorous precipitate species.

FIG. 1 describes an activated sludge process executed in a sequencing batch reactor (SBR) system. The SBR activated sludge process is a type of an activated sludge treatment system and differs from a specific fill and draw version of the continuous flow-through activated sludge process systems. In contrast to continuous flow-through activated sludge treatment systems, the sequencing batch processes in the SBR is time oriented (not physical space oriented) where metabolic reaction as well as solid/liquid separation take place at different times in the same reactor. This differs from other conventional flow-through activated sludge processes which require separate tanks for the activated sludge treatment and solids separation. A conventional SBR activated sludge treatment process is designed to remove carbon, phosphorous and nitrogen from wastewater.

In FIG. 1, wastewater may enter an activated sludge SBR treatment vessel 11 through an influent pipe 20. The wastewater mixes with activated sludge that was left in the activated sludge SBR treatment vessel 11 from previous reaction cycles. The introduced wastewater and the activated sludge accumulate in the reaction zone 30 of the activated sludge SBR treatment vessel 11. A mixing system 40 is operated to keep the wastewater activated sludge mixture in suspension during anaerobic and anoxic treatment cycles. A diffused aeration system 50 may be positioned, for example, on the bottom the activated sludge SBR treatment vessel 11 to supply oxygen during the biological activated sludge treatment process. The oxygen to the diffused aeration system 50 is supplied by a blower 60 that is connected to the diffused aeration system 50 via an air pipe 70.

The embodiments described herein are not limited to use of the blower 60 and the diffused aeration system 50 for supplying oxygen, as may be appreciated. Alternatively, the system may employ a surface aeration system or use pure oxygen gas. A measurement system 80 may be located inside the reactor 11, which can be configured to measure ammonia, nitrate, and/or oxygen reduction potential, and/or any of the previous described methods to determine the mediums ionic activity directly and/or indirectly including one or more measuring methods of TDS concentration, water resistance/resistivity, water salinity, water conductivity, water hardness, concentration of one or more earth minerals, and water light absorbance and/or transmittance.

In the sequential anaerobic and aerobic activated sludge wastewater process of the SBR reactor, wastewater may be treated through the course of operation in an anaerobic phases and aerobic phase. During the anaerobic phase, organic matter of the wastewater is received under mixing conditions 40 through influent pipe 20. The influent wastewater may be added until a maximum level set point in the SBR reactor is met. The influent flow may then switched to another SBR treatment reactor vessel 11. During the anaerobic cycle the operation of the blower 60 is terminated to introduce an environment that is free of dissolved oxygen. Under anaerobic conditions, pollutants of the wastewater are hydrolyzed to form soluble phosphorous, nitrogen, and carbon compounds. A controller 90 may control the SBR activated sludge process and initiate anaerobic, aerobic, and anoxic conditions, for instance, by turning on the blower 60 and the mixing system 40 based on timer set points and the nutrient values received from the measurement system 80. It is understood that the measurement system 80 may include one or more sensors and/or analyzers, such as hardware sensors.

The controller 90 may include one or more computing devices, such as an industrial programmable logic controller, personal computer, server computing, portable computing device, or other similar computing device. Alternatively, the controller 90 may include processing circuitry, which may include an integrated circuit (IC) or a microcontroller in some embodiments. In any event, operation of the controller 90 may be dictated by programming instructions through execution of the programming instructions using at least one hardware processor.

There are different modes for the controller 90 to calculate a length of an anaerobic SBR process cycle, for example, by using one or more measurements obtained from the measurement system 80, one or more parameters of the wastewater ammonia concentration 80 against a maximum set point [SBR-NH$_3$-Max], and/or measuring the oxygen reduction potential measured by the measurement system 80 against a minimum oxygen reduction potential set point [SBR-ORP-Min], and/or determining the length of the anaerobic treatment cycle against a maximum cycle time set point [SBR-AN-T-Max], and/or determining the length of the anaerobic cycle by measuring against a maximum set point for ionic activity, here expressed as [SBR-TDS-Max].

Another method of determining the length of the anaerobic cycle is by measuring, via the measurement system 80, against one or more maximum set points for: earth mineral concentration and/or soluble metal concentrations expressed as [SBR-Earth-Max], a maximum conductivity set point [SBR-Con-Max], a maximum water hardness set point [SBR-WH-Max], a maximum water resistance set point [SBR-WR-Max], a maximum water salinity set point [SBR-Sal-Max], and/or a maximum water light absorbance set point [SBR-Li-Max].

The increase of ammonia during the anaerobic treatment phase is monitored until a maximum ammonia set point is met [SBR-NH$_3$-Max] since during the anaerobic treatment phase organic matter is hydrolyzed resulting in an increase of ammonia ions. The decrease of the oxygen reduction potential during the anaerobic treatment cycle occurs because the wastewater is treated in the absence of air. The oxygen reduction potential measurement indicates the wastewater has achieved a state in which it is able to receive or gain electrons. The anaerobic treatment phase represents a strongly reducing environment and consequently the oxygen reduction potential measurements obtained are decreasing over the time of the anaerobic treatment phase.

The increase of ionic activity during the anaerobic treatment phase is monitored until a maximum ionic activity concentration is met [SBR-TDS-Max] and occurs during the anaerobic treatment phase because organic matter is hydrolyzed resulting in an increase of the ionic concentration by forming soluble species of ammonia, phosphorous, carbon, earth minerals (like calcium, magnesium), and/or metals which consequently results in an increase in the ionic activity. The increase of the earth mineral and metal concentration [SBR-Earth-Max], light absorbance [SBR-Li-Max], water salinity [SBR-Sal-Max], conductivity concentration [SBR-Con-Max], water resistance/resistivity concentration [SBR-WR-Max], and/or water hardness [SBR-WH-Max] during the anaerobic treatment phase is caused since the hydrolysis of the organic and inorganic contents generates soluble species of ammonia, phosphorous, carbon, and earth minerals and metals all of which contributing to an increase in the ionic activity.

In one embodiment, a combination of factors considered include the maximum timer cycle set point [SBR-AN-T Max], with any of the nutrient values including a maximum set point of ionic activity [SBR-TDS-Max], maximum ammonia set point [SBR-NH$_3$-Max], minimum ORP set point [SBR-ORP Min], maximum earth mineral and/or metal concentration [SBR-Earth-Max], a maximum conductivity set point [SBR-Con-Max], a maximum water hardness set point [SBR-WH-Max], a maximum water resistance set point [SBR-WR-Max], a maximum water salinity set point [SBR-Sal-Max], and/or a maximum water light absorbance set point [SBR-Li-Max].

In various embodiments, the anaerobic phase may be terminated by turning off the mixer system 40 and initiating aerobic conditions by turning on the blower system 60 and supplying air through the diffused aeration system 50 to the SBR reactor 10. As previously described, the anaerobic treatment phase may be followed by the aerobic treatment phase in a wastewater activated sludge treatment system, which initiates luxurious phosphorus uptake and/or earth mineral phosphorous precipitation reactions of soluble phosphorus species with reactive ions, which include one or more alkali and/or alkaline-earth species and/or soluble metals species to form non-soluble phosphorous precipitate species. In SBR process systems, the ammonia reduction progress, the luxurious phosphorous removal progress, and/or the earth mineral phosphorous precipitation progress can be determined through various forms of measurements of the ionic activity which is expressed in this example as TDS measurements.

The controller 90 is configured to calculate the slope progress of the ionic activity using the TDS concentration (obtained by the measurement system 80) [SBR-TDS-MIN] and treatment time duration values which allows for determining the reaction progress and reaction end point of ammonia reduction through nitrification, the biological luxurious phosphorus uptake, and/or the earth mineral phosphorous precipitation process in the activated sludge. The time of the duration of the aerobic cycle can be any amount, but is often between 2 and 48 hours.

Other reactions of soluble phosphorous may form insoluble compounds, such as phosphorous inorganic matter complexes, that may also impact the total phosphorous concentration in the wastewater. Accordingly, in various embodiments described herein, the controller 90 may also monitor the overall effect of those reactions on the measurements of the total concentration of soluble phosphorous. The aerobic treatment phase typically also includes a maximum cycle timer [SBR-AIR-T Max] that is monitored by the controller 90. The aerobic treatment phase is terminated if the maximum aerobic cycle time [SBR-AIR-T Max] and/or the set point for the slope progress of the ionic activity is met.

Other methods to measure the aerobic treatment phase of the aeration phase include measuring, by the controller 90, the slope progress at one or more treatment steps against minimum set points for the conductivity [SBR-Con-Min], the water hardness [SBR-WH-Min], the water resistance [SBR-WR-Min], the water salinity [SBR-Sal-Min], the earth mineral and metal concentration [SBR-Earth-Min], and/or the minimum water light absorbance set point [SBR-Li-Min].

The biological activated sludge SBR treatment process may further include an optional anoxic treatment phase, after the aerobic treatment, to reduce nitrogen oxide compounds that may have been generated during the aerobic treatment cycle. The anoxic treatment phase is initiated after the aerobic treatment phase by deactivating the blower 60 and turning on the mixing system 40. The duration of the anoxic treatment phase may be monitored by the controller 90, for instance, by measuring the reduction in concentration of one or more nitrogen oxide species (obtained via the measurement system 80) from a minimum set point [SBR-NO3-Min], and/or by using a timer to measure the change in treatment duration time of the anoxic treatment cycle from a maximum anoxic cycle time set point [SBR-ANOX-T Max].

The biological treatment phase of the activated sludge SBR process can consist of multiple anaerobic, aerobic, and/or anoxic treatment sequences. The treatment sequences may follow various configuration patterns not limited to any certain sequential orders or time durations. The treatment sequences may be repeated until the wastewater mixed liquor meets the targeted nutrient criteria for effluent disposal, for example, effluent criteria for total nitrogen, soluble phosphorous, and total carbon content. Anaerobic, aerobic, and/or anoxic wastewater activated sludge treatment sequences can be organized in other various and more complex strategies to achieve optimal phosphorous, nitrogen and carbon pollutant removal.

After the biological treatment sequence (anaerobic, aerobic and/or anoxic treatments) is completed, the controller 90 may turn off the mixing system 40 and the blower 60, allowing the activated sludge in the SBR treatment vessel 11 to enter a settling phase. The settling phase in the SBR process is typically time controlled and allows the solids fraction to separate by gravity and settle to the bottom of the basin and the liquid fraction to separate on the top. A portion of the settled mixed liquor on the bottom of activated sludge SBR treatment vessel 11 is removed from the system by a wasting pipe 100. The removed fraction is referred to as "waste activated sludge," and is removed from the system because microorganisms present in the activated sludge grew and repopulated their cell mass during the course of the biological treatment process. The excess waste activated sludge portion may be removed from the activated sludge SBR treatment vessel 11, and then treated in the digester biosolids treatment process to produce stabilized biosolids for disposal to a land application site or other biosolids disposal option.

The system may further include a decanting system 110, which may float on the surface of the activated sludge SBR treatment vessel 11. The decanting system 110 may be controlled by the controller 90. The decanting system 110 may remove the clear water portion on the top of activated sludge SBR treatment vessel 11 until a predetermined level set point [SBR-Level-Min] of the activated sludge SBR treatment vessel 11 is met. The water that is removed from the activated sludge SBR treatment vessel 11 is transferred to subsequent treatment phases (including filtration and/or disinfection) through a decanting pipe 120. After the decanting phase is completed, the new influent wastewater may be added to the activated sludge SBR treatment vessel 11 through the reactor vessel influent pipe 20 to start the treatment cycle over.

Figure 2:
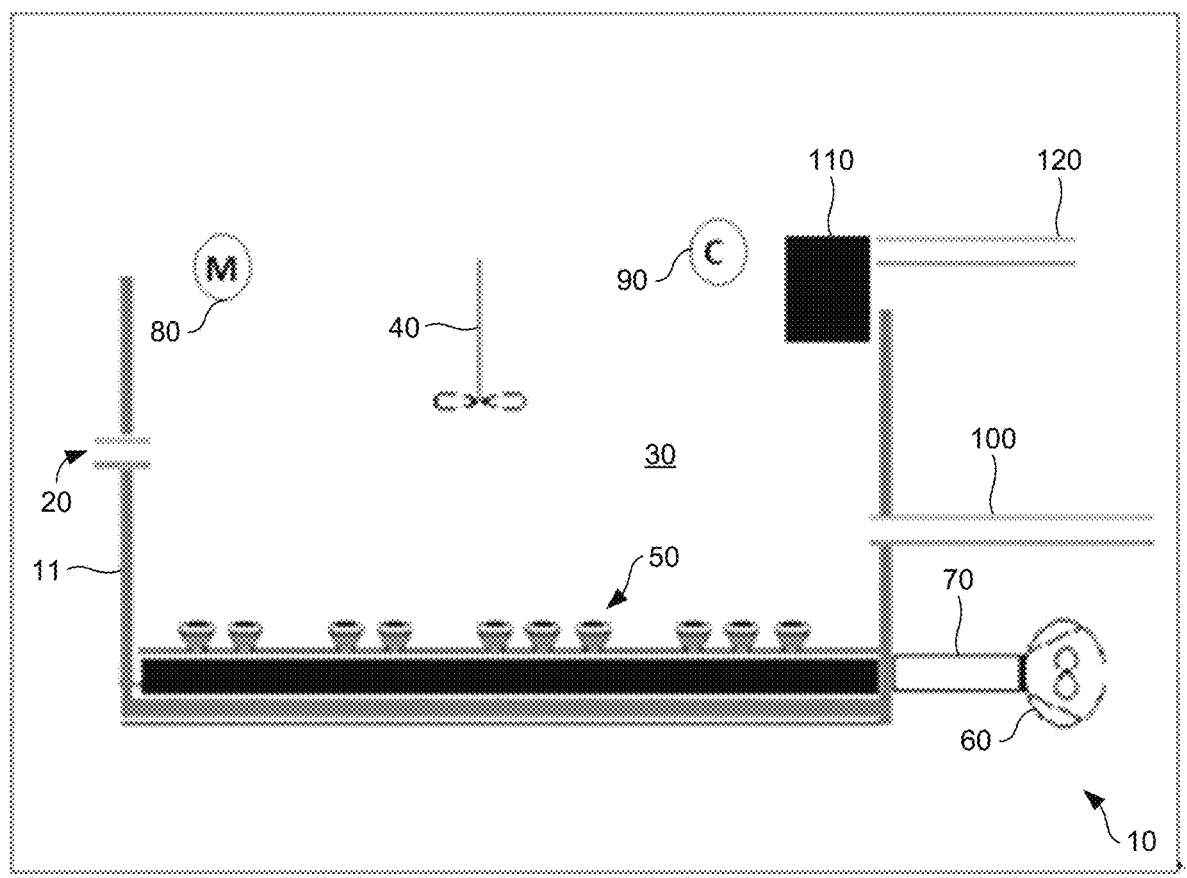
FIG. 2 is a diagram that describes one or more treatment vessels as part of a flow-through digester biosolids treatment process for treating digester biosolids to reduce the organic content, nitrogen concentration, and/or soluble phosphorous concentration according to various embodiments of the present disclosure.

FIG. 2 describes a treatment vessel as part of a flow-through digester biosolids treatment process (anaerobic/aerobic digestion for enhanced solids and nitrogen removal) consisting of a series of basins. In the flow-through digester treatment process, a bacterial biomass suspension is responsible for the digestion and hydrolysis that stabilizes the biosolids by reducing the organic biomass and pollutants of the septage coming from outside facilities, waste activated sludge coming from the activated sludge wastewater treatment process, and/or primary sludge coming from the primary wastewater process settling basins. The bacterial biomass responsible for the digestion process is generated and cultivated in the digester treatment process while treating the incoming pollutant loadings.

Depending on the design and the specific application, which are not limited herein, a flow-through digester treatment process can achieve nitrogen removal, phosphorous removal (comprising of earth mineral phosphorous precipitation and/or biological luxurious phosphorous removal), along with the removal of organic carbon substances and the reduction of organic solids contents. The treatment sequences of anaerobic, aerobic, and anoxic cycles can be repeated until the digester biosolids meet the targeted criteria for organic biosolids reduction, class B Biosolids standards, and/or other disposal standards. Continuous flow-through digester biosolids treatment process systems have a wide variety of configurations. In FIG. 2, the septage, waste activated sludge, and/or primary sludge is mixed with a high proportion of microorganisms that are put into the flow-through digester treatment reactor 10 through an influent pipe 20 beforehand. In some embodiments the microorganisms are already present inside reactor 10 since microorganisms cultivate from the breakdown of organic biomass.

The flow-through digester treatment reactor 10 stirs the digester biosolids through a mixing system 40 and introduces air coming from the diffused aeration system 50 to provide oxygen and keep the digester biosolids solids in suspension. The oxygen to the diffused aeration system 50 is supplied by a blower 60 that is connected to the diffused aeration system 50 via an air pipe 70. The system is not limited to using a blower 60 and a diffused aeration system 50 for supplying oxygen and instead may use a surface aeration system and/or pure oxygen gas. The controller 90 may turn on the mixer 40 when the oxygenation from the blower 60 is turned off to keep the digester biosolids content stirred up and suspended during the anaerobic and/or anoxic treatment cycles.

A measuring system 80 may be located inside the digester reactor 10 that can be configured to measure oxygen reduction potential ammonia, nitrate, and/or using any of the previous described methods to determine the mediums ionic activity directly or indirectly through one or more measurements of TDS concentration, water light absorbance and/or transmittance, water resistance/resistivity, water salinity, water conductivity, water hardness and/or the concentration of one or more earth minerals. The controller 90 controls the digester process and initiates anaerobic, aerobic and anoxic conditions, by turning on the blower 60 and the mixer 40 based on timer set points and nutrient values received from the measuring system 80.

During the anaerobic treatment phase when the blower system 60 is terminated, the ammonia, phosphorous, and soluble carbon concentrations are increasing (determined by the measuring system 80 as an increase in TDS concentration) inside the reactor tank.

During the anaerobic treatment cycle, the mixer 40 may operate at the instruction of the controller 90 to keep the digester biosolids in suspension. The length of the anaerobic cycle is controlled by the controller 90, which monitors the cycle time duration against a maximum air cycle set point [DIG1-AN-T-Max], a maximum concentration set point of the ionic activity [DIG1-TDS-Max], a maximum conductivity set point [DIG1-Con-Max], a maximum water light absorbance set point [DIG1-Li-Max], a maximum water hardness set point [DIG1-WH-Max], a maximum water resistance set point [DIG1-WR-Max], a maximum water salinity set point [DIG1-Sal-Max], a minimum set point of the oxygen reduction potential [DIG1-ORP-Min], a maximum set point of ammonia concentration [DIG1-NH3-Max], and/or a maximum earth mineral and or metal concentration [DIG1-Earth-Max].

Once the anaerobic digester treatment phase is completed, the aerobic treatment phase is initiated by turning off the mixer 40 and turning on the blower 60 to supply air through the diffused aeration system 50 into the digester treatment process. During the aerobic digester treatment phase, ammonia and soluble phosphorous concentrations are reduced. The ammonia reduction progress and end point occur from nitrification, the luxurious phosphorous removal process, and/or the earth mineral phosphorous precipitation progress can be determined through various forms of measurements of the ionic activity by the measuring system 80. One example includes using the TDS measurement obtained by the measurement system 80 to determine the ammonia reduction progress and end point, the reaction progress and end point of the biological luxurious phosphorus uptake, and/or the reaction progress and end point of the earth mineral phosphorous precipitation in the digester biosolids treatment process.

The blower 60 of the digester treatment process is regulated by the controller 90 which monitors one or more set points of the slope progress of the mediums ionic activity measured as TDS concentration by the measuring system 80. The controller 90 is configured to receive the measurements directly from measuring system 80 (having one or more sensors and/or analyzers) and then calculate the slope using TDS [DIG1-TDS-Min], conductivity [DIG1-Con-Min], water light absorbance set point [DIG1-Li-Min], salinity [DIG1-Sal-Min], water resistance [DIG1-WR-Min], water hardness [DIG1-WH-Min], and/or alkali and/or alkaline-earth species and/or soluble metals species concentration [DIG1-Earth-Min] to determine the reduction of ammonia through nitrification, the luxurious phosphorus uptake, and/or the earth mineral phosphorous precipitation reactions of soluble phosphorus species with reactive ions. Operation of the controller 90 may be terminated if the aerobic treatment phase maximum cycle time is met [DIG1-AIR-T Max], or if one of the setpoints for the slope progresses of ionic activity is met is met. The aerobic treatment phase is terminated when the controller 90 turns off the blower 60 and turns on the mixing system 40 system to initiate the anoxic treatment phase or another anaerobic phase.

The anoxic treatment phase reduces nitrate compounds that were previously generated in the aerobic treatment cycle where ammonia was oxidized through nitrification processes under aerobic conditions. The anoxic phase may be controlled by a timer of the controller 90 until a maximum set point [DIG1-ANOX-T Max] is reached and/or a minimum set point of nitrate species concentration [DIG1-$NO_3$-Min] is reached, which may be determined directly through a nitrate measuring device in the measuring system 80. The measuring system 80 may include one or more nitrate sensor probes or analyzers, such as the Hach Nitratax sc. Once the aerobic and anoxic treatment phases are completed an optional decanting phase can be initiated by the controller 90. During the digester decanting phase, the mixing system 40 and the blower 60 may be turned off, allowing the biosolids inside digester treatment vessel 11 to settle by gravity.

The settling phase in the digester process is typically time controlled according to a maximum set point [DIG1-DEC-T Max] which allows for the solids fraction of the digester biosolids to separate by gravity and settle to the bottom of the basin while the liquid fraction is suspended on top.

A decanting system 110 may float on the surface of the digester treatment vessel 11, which may be controlled by the controller 90. The decanting system 110 may remove the clear water portion on the top of digester treatment vessel 11 through a decanting pipe 120 until a predetermined level set point [DIG1-Lev 1-Min] in the digester treatment vessel 11 is met. The removed water from digester treatment vessel 11 (which may referred to as digester side streams or digester recycle streams) may be transferred through the decanting pipe 120 to the wastewater treatment plant to be treated in the activated sludge treatment process.

The digester system 10 may further include an effluent pipe 100 that removes the treated biosolids from the treatment vessel 11 to a dewatering system which may separate the liquid phase and the solid phase of the digester biosolids with a mechanical dewatering device. The dewatering device for wastewater treatment biosolids may include one or more centrifuges, belt filter presses, and screw presses. However, there are other types of dewatering systems and the scope of this embodiment shall not be limited to the listed systems. The dewatering system may separate the solid fraction of the biosolids by adding a polymer to the sludge to aid the separation of solids and water. The dewatered biosolids may then be moved off site for disposal.

The water separated from the dewatering system may be called digester side streams or digester recycle streams, having reduced nutrients. The processing water from the biosolids dewatering system may be treated in the activated sludge treatment process.

The digester biosolids treatment processes can consist out of multiple anaerobic, aerobic, anoxic, and/or decanting sequences. The treatment sequences can follow in various configuration patterns not limited to any certain sequential order or treatment time duration. The treatment sequences can be configured and repeated until the digester biosolids meets the targeted criteria for organic biosolids reduction, class B Biosolids standards, and/or other disposal standards.

Figure 3:
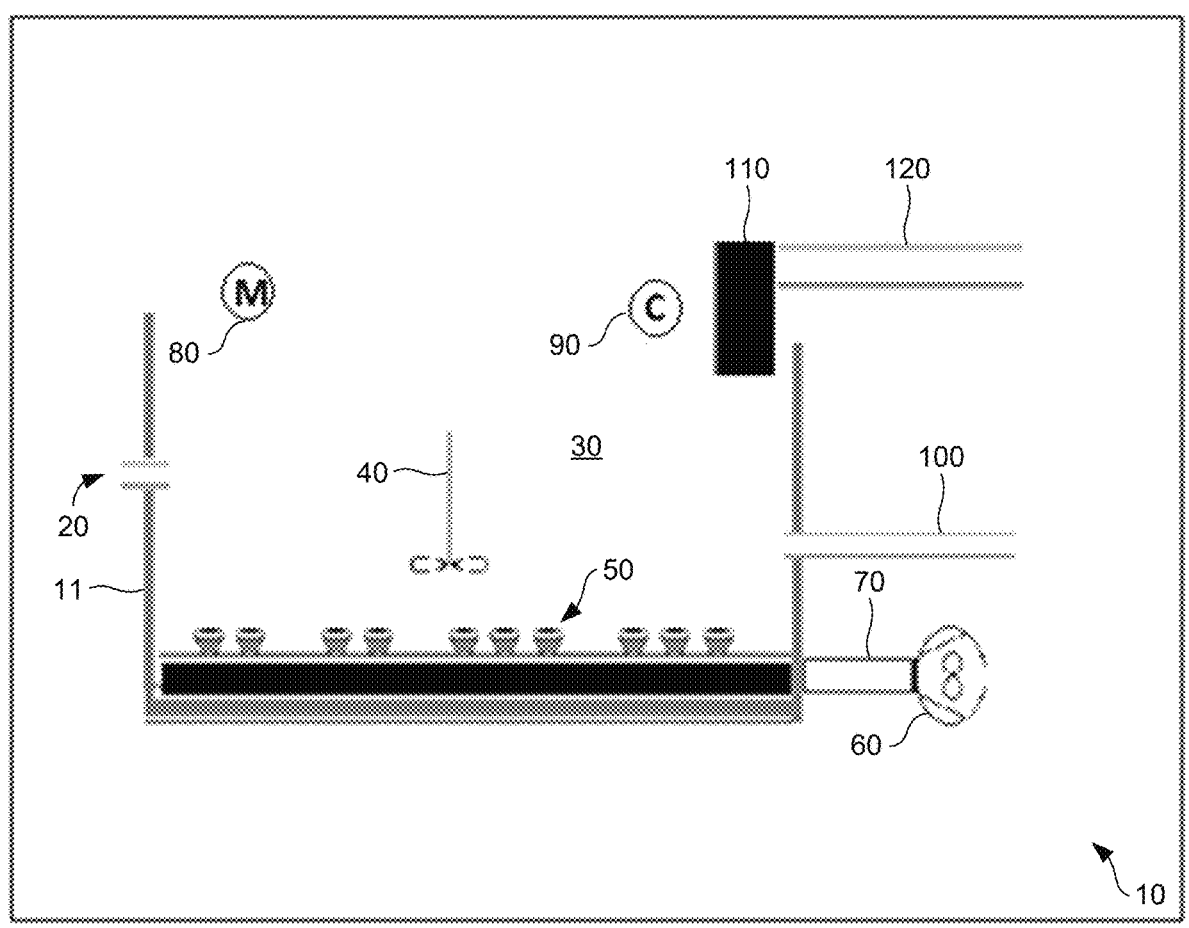
FIG. 3 is a diagram that depicts a sequential anaerobic-aerobic digester biosolids treatment system for treating digester biosolids to reduce the organic content, nitrogen concentration, and/or soluble phosphorous concentration according to various embodiments of the present disclosure.

FIG. 3 depicts a sequential anaerobic-aerobic digester biosolids treatment system that includes an optional anoxic treatment phase. In FIG. 3 the digester biosolids are treated in a digester reactor 10. Septage from outside facilities, waste activated sludge, and/or primary sludge are received through an influent pipe 20. The digester biosolids are accumulated in the reaction zone 30 of the treatment vessel 11. A mixing system 40 is operated to keep the digester biosolids in suspension. A diffused aeration system 50 on the bottom of treatment vessel 11 supplies oxygen during the biological treatment process. The oxygen of the diffused aeration system 50 is supplied by a blower 60, that may be connected to the diffused aeration system 50 via an air pipe 70. The system is not limited to using a blower 60 and a diffused aeration system 50 for supplying oxygen. Alternatively, the system may use a surface aeration system or pure oxygen gas.

In the sequential anaerobic and aerobic digestion process the digester biosolids may be treated through the creation of anaerobic phases, aerobic phases, and/or optimal anoxic treatment phases. The digester biosolids treatment processes may consist multiple anaerobic, aerobic, and/or alternatively anoxic treatment sequences having varying durations. The treatment sequences can follow in various configuration patterns not limited to any certain sequential order or duration. The treatment sequences can be configured and repeated until the digester biosolids meets the targeted criteria for organic biosolids reduction, class B Biosolids standards, and/or other disposal standards.

States or stages of anaerobic, aerobic, and/or anoxic wastewater activated sludge treatment may be organized in other various and more complex strategies to achieve optimal phosphorous and pollutant removal. For instance, after each aerobic or anoxic treatment sequence, a decanting cycle can be implemented to thicken the solids concentration of the digester biosolids.

During the anaerobic phase the biosolids may be hydrolyzed to form soluble nitrogen and carbon compounds. The hydrolyzation of organic biosolids content reduces the organic sludge mass, treats the biosolids for Class B Biosolid Standards (if required), and reduces the sludge disposal and hauling costs. The controller 90 monitors the cycle time of the anaerobic digester treatment cycle against the maximum cycle time set point [DIG2-AN-T Max] to interrupt the anaerobic treatment phase.

The measurement system 80 may be positioned inside the reactor basin 11. The measurement system 80 may send measurement results to the controller 90, for instance, as a digital or analog signal. The measurement system 80 may be configured to measure the oxygen reduction potential and ammonia concentration using any of the previous described methods to determine the mediums ionic activity directly or indirectly, including one or more measuring systems of TDS concentration, water resistance/resistivity, water salinity, water light absorbance and/or transmittance, water conductivity, water hardness, and/or concentration of one or more earth minerals or metals.

Various processes may be employed to control the length of the anaerobic digester process cycle, for example by measuring one or more parameters of the digester biosolids ammonia concentration against a maximum set point [DIG2-NH3-Max], measuring the oxygen reduction potential against a minimum oxygen reduction potential set point [DIG2-ORP-Min], measuring the length of the anaerobic treatment cycle against a maximum cycle time set point [DIG2-AN-T Max], measuring the cycle time against a maximum TDS concentration set point [DIG2-TDS-Max], measuring the cycle time against a maximum water conductivity concentration set point [DIG2-Con-Max], measuring the cycle time against a maximum water light absorbance set point [DIG2-Li-Max], measuring the cycle time against a maximum water resistance/resistivity set point [DIG2-WR-Max], measuring the cycle time against a maximum water hardness set point [DIG2-WH-Max], measuring the cycle time against a maximum salinity [DIG2-Sal-Max], and/or against a maximum earth mineral and metal concentration set point [DIG2-Earth-Max].

Typically, the anaerobic digester cycle can be adjusted to achieve different levels of treatment set points [DIG2-AN-T Max]. The anaerobic treatment cycle may be terminated by the controller 90 if the maximum anaerobic cycle time set point [DIG2-AN-T Max] is met, if one of the maximum set points for the ionic activity set point [DIG2-TDS-Max] is met, if a maximum ammonia concentration set point [DIG2-NH3-Max] is met, if a minimum ORP concentration set point [DIG2-ORP-Min] is met, if a maximum earth mineral and/or metal concentration set point [DIG2-Earth-Max] is met, if a maximum water light absorbance set point is met [DIG2-Li-Max], if a maximum water conductivity concentration set point [DIG2-Con-Max] is met, if a maximum water resistance/resistivity concentration set point [DIG2-WR-Max] is met, a maximum salinity [DIG2-Sal-Max] and/or if a maximum water hardness concentration set point [DIG2-WH-Max] is met. During the anaerobic cycle of the digester biosolids treatment process, ammonia may be generated due to the decomposition of organic cell mass. The length of the anaerobic cycle may be controlled by the controller 90, for instance, by monitoring the generated ammonia concentration of the digester biosolids against a maximum ammonia concentration set point [DIG2-NH3-Max].

The decrease of the oxygen reduction potential to the target minimum set point [DIG2-ORP-Min] during the anaerobic treatment cycle occurs because the digester biosolids are treated in the absent of air. The oxygen reduction potential measurement indicates a relative charge state of the digester biosolids for it to receive or gain electrons. The anaerobic treatment phase represents a strongly reducing environment and consequently the oxygen reduction potential measurements obtained are decreasing over time of the anaerobic treatment phase.

The increase of the ionic activity, as measured through TDS against a target maximum set point [DIG2-TDS-Max], conductivity concentration set point [DIG2-Con-Max], salinity [DIG2-Sal-Max], water resistance/resistivity concentration set point [DIG2-WR-Max], water light absorbance [DIG2-Li-Max], and/or water hardness set point [DIG2-WH-Max] during the anaerobic treatment cycle occurs because the digester biosolids are treated in the absence of air and the hydrolysis of the digester organic solids generates soluble species of ammonia, phosphorous, carbon and earth minerals and metals which all contribute to increasing the ionic activity. The increase of the concentration of soluble earth minerals and metals may be measured with a sensor probe and/or spectrophotometer (not shown).

The increase in soluble earth minerals and metals during the anaerobic treatment cycle is caused from dissolved ions creating acidic conditions which react with the earth mineral and metal species and increase the ionic earth mineral and metal concentrations.

Once the anaerobic treatment-phase is completed the mixing system 40 is terminated by the controller 90 and the aerobic treatment phase is initiated by turning on the blower 60 and supplying air through the diffused aeration system 50 to the digester biosolids. During the anaerobic, aerobic, and optional anoxic treatment phases in the digester treatment reactor vessel 11, nitrogen, phosphorous, and carbon are treated continuously. As previously described, the cycling of an anaerobic treatment phase followed by an aerobic treatment phase in a digester biosolids treatment system initiates luxurious phosphorus uptake and/or the earth mineral phosphorous precipitation reactions of soluble phosphorus species with reactive ions, including one or more alkali and/or alkaline-earth species and/or soluble metals species to form non-soluble phosphorous precipitate species.

The controller 90 may be configured to obtain measurements from measuring system 80 to calculate the slope for TDS [DIG2-TDS-Min], conductivity [DIG2-CON-Min], salinity [DIG2-Sal-Min], water light absorbance [DIG2-Li-Min], water resistance [DIG2-WR-Min], water hardness [DIG2-WH-Min], and/or alkali and/or alkaline-earth species and/or soluble metals species directly [DIG2-Earth-Min]. This information may be used by the controller 90 to determine the reaction progress and endpoint of ammonia reduction through nitrification, the reaction progress and end point of luxurious phosphorus uptake, and/or the reaction progress and end point of earth mineral phosphorous precipitation reactions of soluble phosphorus species with reactive ions. Other reactions of soluble phosphorous may form insoluble compounds such as phosphorous inorganic matter complexes which may also impact the total phosphorous concentration in the wastewater and the embodiment of this invention would also be able to monitor the overall effect of those reactions on the measurements of the total concentration of soluble phosphorous.

The biological digester treatment process may also optionally include an anoxic treatment phase to reduce nitrogen oxide compounds that were generated during the aerobic treatment cycle. The duration of the anoxic treatment phase may be monitored by the controller 90 by measuring the reduction of one or more nitrogen oxide species concentration against a minimum set point and/or using a timer measuring the treatment duration of the anoxic treatment cycle against a maximum anoxic cycle set point [DIG2-ANOX-T Max]. The time of the duration of the anoxic cycle can be any amount, but is often between 2 and 24 hours and/or until most nitrate species are completely denitrified resulting in a low nitrate concentration.

Once the anaerobic, aerobic, and alternative anoxic treatment phase are completed an alternative decanting phase can be initiated by the controller 90. During the digester decanting phase the mixing system 40 and the blower 60 are turned off by the controller 90, which allows the biosolids in the digester treatment vessel 11 to enter a settling phase. The settling phase in the digester process is typically time controlled according to a maximum set point [DIG2-DEC-T Max] and allows the solids fraction to separate by gravity and settle to the bottom of the basin and the liquid fraction to suspend on the top.

A decanting system 110 may float on the surface of the digester treatment vessel 11, where the decanting system 110 may be controlled by the controller 90. The decanting system 110 may remove a clear water portion on the top of digester vessel 11 through a decanting pipe 120 until a predetermined level set point [DIG2-Lev 1-Min] in the digester treatment vessel 11 is met. The water that is removed from digester treatment vessel 11 may be transferred to the treatment plant influent through the decanting pipe 120. The separated waters from the decanting system are also called digester side streams or digester recycle streams, and are reduced in nutrients.

After the biological digester treatment phase is completed, the reactor vessel 11 may be emptied to a predetermined level set point [DIG2-Lev 2-Min] through an effluent pipe 100, which may deliver the treated biosolids to the dewatering process. The absorbed and adsorbed phosphorous compounds that were previously bound to the digester biosolids during the treatment process are transported to the biosolids dewatering process where the liquid fraction and the solids fraction are separated from the biosolids. The liquid fraction is returned to the treatment plan headworks and the dewatered biosolids containing phosphorous compounds are hauled off site to a final disposal site. The separated waters from the dewatering system are also called digester side streams or digester recycle streams, and are reduced in nutrients.

FIG. 4 depicts an example how the ammonia concentration is reduced through nitrification processes and the phosphorous concentration is reduced through (a) soluble phosphorous species reaction progress and (b) end point control during the aerobic phase of a fluctuating anaerobic-aerobic digester biosolids treatment process in flow-through and/or sequential batch type operational mode. The nitrification processes and soluble phosphorous species reaction progress and end point are determined by monitoring the nitrification reaction process and the luxurious phosphorus uptake process, and/or the reaction progress of the soluble phosphorous species with reactive ions including one or more alkali and/or alkaline-earth species and/or soluble metals species to form non-soluble phosphorous precipitate species.

This may be accomplished by monitoring the digester biosolids ionic activity using calculations of the slope progress of the TDS concentration as a function of treatment cycle duration. The expression of the TDS slope progress is representative for all other ionic activity measurements including, but not limited to, the earth mineral and/or metal concentration, water light absorbance and/or transmittance, water salinity, water conductivity concentration, water resistance/resistivity concentration, and/or the water hardness concentration. The TDS slope progress may be applied to various ionic activity measurement techniques. Other reactions of soluble phosphorous may form insoluble compounds, such as phosphorous inorganic matter complexes, and could also impact the total phosphorous concentration in the digester biosolids. The embodiments described herein may also monitor the overall effect of those reactions on the measurements of the total concentration of soluble phosphorous.

In various embodiments, the reaction progress of ammonia reduction through nitrification processes and soluble phosphorous species reduction during the oxygenation phase of the digester treatment process is determined from the slope of a plot of TDS concentration as a function of treatment cycle duration at one or more treatment progress steps in the digester treatment phase. The slope of a plot of TDS concentration as a function of treatment cycle duration directly correlates to the reduction of ammonia through nitrification processes and reaction progress of soluble phosphorous species reduction.

Different characteristics in the types of changes of slope in a plot of TDS concentration as a function of treatment cycle duration reflect changes in the reaction progress of ammonia reduction through nitrification and soluble phosphorous species reduction. To determine the reactions are nearing the end point, the plot of TDS concentration as a function of treatment cycle duration must be negative (indicative of ammonia reduction and soluble phosphorous still actively reducing). Then, the plot shows a decrease in slope to a target set point (indicative of soluble phosphorous reduction slowing down or stopping).

If at this point the oxygenation is continued, the slope of the plot of TDS concentration as a function of treatment cycle continues to decrease, but inflects to a reduced rate. This indicates that other biological reactions are reducing the ionic activity including ammonia reduction through nitrification (without actively reducing soluble phosphorous). If the slope progress shows a second inflection (or achieves a slope of zero during the inflection), then this is indicative of nitrification slowing down or completely stopping.

After nitrification reaction progress has stopped an increase of the slope is caused by nitrifying acids that are generated which react with insoluble earth minerals. An increase the concentration of nitrates that no not denitrify is also experienced, due to a lack of available soluble carbon. Other ionic species may be present that can increase the ionic activity of the medium.

Referring now to FIG. 4, the table shows the characteristics of ammonia reduction through nitrification and the soluble phosphorous species reaction progress with corresponding TDS concentrations, and plot slope calculations during the digester oxygenation phase.

Column 1 describes the aeration time of the digester oxygenation phase. Column 2 describes the TDS concentration measurements taken at 1 hour time intervals during the digester oxygenation phase. Column 3 describes the difference of the current TDS concentration measurement from the prior measurement (actual TDS concentration measurements are shown in Column 2). Column 4 describes the soluble phosphorous species concentration measurements taken at 1 hour time intervals during the digester oxygenation phase. The soluble phosphorous species concentration was determined by analysis using DIN EN ISO 6878:2004-09. Column 5 describes the difference of the current soluble phosphorous concentration measurement from the prior measurement (actual soluble phosphorous concentration measurements are shown in Column 4). Column 6 describes the ammonia concentration measurements taken at 1 hour time intervals during the digester oxygenation phase. The ammonia concentration was be determined by analysis using EPA METHOD 350.1 Column 7 describes the difference of the current ammonia concentration measurement from the prior measurement (actual ammonia concentration measurements are shown in Column 6).

TABLE 2

| Column 1 Aeration Time (hours) | Column 2 TDS (mg/L) | Column 3 Δ TDS (mg/L) | Column 4 P (mg/L) | Column 5 Δ P (mg/L) | Column 6 NH$_3$ (mg/L) | Column 7 Δ NH$_3$ (mg/L) |
| --- | --- | --- | --- | --- | --- | --- |
| 0 | 1279 | N/A | 182 | N/A | 40 | N/A |
| 1 | 1145 | −134 | 80 | −102 | 40 | 0 |
| 2 | 1091 | −54 | 38 | −42 | 40 | 0 |
| 3 | 1056 | −35 | 27 | −11 | 38 | −2 |
| 4 | 1021 | −35 | 25 | −2 | 36 | −2 |
| 5 | 1004 | −17 | 25 | 0 | 33 | −3 |
| 6 | 987 | −17 | 25 | 0 | 29 | −4 |
| 7 | 966 | −21 | 25 | 0 | 23 | −6 |
| 8 | 944 | −22 | 25 | 0 | 18 | −5 |
| 9 | 926 | −18 | 25 | 0 | 13 | −5 |
| 10 | 914 | −12 | 25 | 0 | 10 | −3 |
| 11 | 904 | −10 | 25 | 0 | 7 | −3 |
| 12 | 899 | −5 | 25 | 0 | 4 | −3 |
| 13 | 889 | −10 | 25 | 0 | 1 | −3 |
| 14 | 885 | −4 | 25 | 0 | 0 | −1 |
| 15 | 885 | 0 | 25 | 0 | 0 | 0 |

In Table 2, data is shown for TDS, phosphorous, and ammonia concentration measurements taken as a function of digester oxygenation time. The rapid reduction of the values in the column with the Δ TDS (change in TDS) from hour 1 to hour 4 is indicative of when the soluble phosphorus reduction progress nears the end point, which is after approximately 4 hours of the digester oxygenation.

Within those first 4 hours, the TDS slope shows a negative trend that changes from −134 mg/L to −35 mg/L. The early rapid reduction in the Δ TDS measurements correlates to the change in soluble phosphorous species concentration which also shows a rapid reduction mainly occurring up to the 4 hour time point. This is due to the reduction of soluble phosphorus approaching the end point and being completed. The reduction in the change in TDS measurements during the first 4 hours of the aeration cycle is also slightly affected by the ammonia nitrification processes and/or denitrification processes which occur simultaneously and can be observed in the hour 1 through hour 4 data as the ammonia concentration in column 6 is reduced from 40 mg/L to 36 mg/L.

The observable decreases in the values of both the change in TDS concentrations (Δ TDS) and the change in soluble phosphorous species concentrations (Δ P) from about −134 mg/L to −35 mg/L and −102 mg/L to −2 mg/L, respectively, are indicative that the phosphorous reduction progress was active for the first 4 hours (Δ TDS and Δ P values are more negative) but then slowed as it neared the reaction end point by hour 5 (Δ TDS and Δ P only changing by −17 mg/L and −0 mg/L, respectively). Once the Δ TDS values have decreased below a user specified set point (in the table presented here this value could be considered as −35 mg/L/) then soluble phosphorous reduction is completed and only ammonia reduction is still occurring.

The effect of ammonia reduction still occurring after complete reduction of soluble phosphorous can be seen in FIG. 4, where the ammonia concentration is reduced at a rate of −6 mg/L at hour 7 to −1 mg/L at hour 14. This correlates to a more gradual, but measurable, change in the Δ TDS values for the same time range which reduces from −21 mg/L to −4 mg/L.

The slope of a plot of TDS concentration as a function of treatment cycle duration inflects to near zero, which is indicative that ammonia reduction is slowing down or stopping and then the slope may become more positive which is indicative that other ionic species including nitrates are beginning to form that no longer denitrify due to a lack of available soluble carbon. Other ionic species like solubilized earth minerals can also increase the ionic species concentration.

Depending on the site specific conditions during the treatment processes, the competing reduction reactions of ammonia and phosphorous with soluble earth minerals can have an outcome of either ammonia or phosphorous being completely reduced first, but regardless, either outcome is determined by site specific conditions which include, but are not limited to, aeration rates.

FIG. 5 depicts an example data of a method that allows to determine the soluble phosphorous species reaction progress and end point in the aerobic phase of a fluctuating anaerobic-aerobic digester biosolids treatment process with multiple anaerobic and aerobic and/or anoxic treatment cycles that can be operated in a flow-through and/or sequential batch operational mode. The reaction progress of soluble phosphorous species is determined by monitoring luxurious phosphorus uptake process and/or the reaction progress of the soluble phosphorous species with reactive ions including one or more alkali and/or alkaline-earth species and/or soluble metals species as they form non-soluble phosphorous precipitate species. This may be accomplished by monitoring the digester biosolids ionic activity through observation of the slope of the TDS concentration as a function of aerobic phase treatment time.

TDS slope progress is representative for all other ionic activity measurements including, but not limited to, the earth mineral and/or metal concentration, water salinity, water light absorbance and/or transmittance, water conductivity concentration, the water resistance/resistivity concentration, and/or the water hardness concentration. TDS slope progress may be applied to various ionic activity measurement techniques. In some example embodiments presented herein, the anaerobic biosolids treatment duration is limited to keep the maximum ammonia concentration below a threshold such that it has no significant impact on the TDS values and slope calculations. To achieve this, the anaerobic biosolids treatment cycle may be terminated once the ammonia concentration had reached 5 ppm. Other methods as previously described can be used for controlling the length of the anaerobic treatment cycle, which include time control, TDS, ORP, water salinity, water light absorbance and/or transmittance, earth mineral and/or metal concentration, water conductivity, water resistance/resistivity, and/or the water hardness concentration control.

With the concentration of ammonia limited, a major factor contributing to the reduction in TDS values during the subsequent aeration cycle is attributed to the reduction of concentration of soluble phosphorus species. Without significant concentrations of ammonia ions, the slope of TDS values closely follows the slope of soluble phosphorus concentrations. In this example embodiment, the TDS concentration directly correlates to the concentration of soluble phosphorus based on the known relationship between TDS and soluble phosphorus described previously. Other reactions of soluble phosphorous that form insoluble compounds, such as phosphorous inorganic matter complexes, could also impact the total phosphorous concentration in the digester biosolids and the embodiments of this invention would also be able to monitor the overall effect of those reactions on the measurements of the total concentration of soluble phosphorous as determined by TDS or other traditional measurements of ionic activity.

The desired duration of the oxygenation phase and/or delivered quantity of oxygen during the reduction of soluble phosphorous in the aerobic phase and the initiation of a subsequent treatment phases is determined from the slope of a plot of TDS concentration as a function of treatment cycle duration. These TDS concentration values are used to calculate the reaction progress and end point for soluble phosphorous species reduction.

The slope of a plot of TDS concentration as a function of treatment cycle duration has a direct relationship with the reaction progress of soluble phosphorous species reduction. Different characteristics in the types of observed changes of slope in a plot of TDS concentration as a function of treatment cycle duration are reflecting different types of changes in the reaction progress of soluble phosphorous species reduction. To determine the reaction is nearing the end point, the plot of TDS concentration as a function of treatment cycle duration must be negative (indicative of soluble phosphorous still actively reducing) and then show an inflection that decreases the slope to a target set point (indicative of soluble phosphorous reduction slowing down or stopping).

Referring now to FIG. 5, the table shows the measured values of TDS and phosphorous concentration for the soluble phosphorous species reaction progress with a corresponding plot of TDS and phosphorous concentration slope calculations during the digester oxygenation phase illustrated in FIG. 5. Column 1 describes the aeration time of the digester oxygenation phase. Column 2 describes the TDS concentration measurements taken at regular 1 hour time intervals during the digester oxygenation phase. Column 3 describes the difference of the current TDS concentration measurement from the prior measurement (actual TDS concentration measurements are shown in Column 2). Column 4 describes the soluble phosphorous species concentration measurements taken at regular 1 hour time intervals during the digester oxygenation phase. The soluble phosphorous species concentration was determined by analysis using DIN EN ISO 6878:2004-09. Column 5 describes the difference of the soluble phosphorous species concentration measurement from the prior measurement (actual soluble phosphorous species concentration measurements are shown in Column 4).

In the table of FIG. 5, the soluble phosphorus reduction progress nears the end point after approximately 4 hours of digester oxygenation. The $\Delta$ TDS value of −5 mg/L at hour 4 corresponds with a $\Delta$ P value of −2 mg/L. The observable decreases in the $\Delta$ TDS and $\Delta$ P values from about −136 mg/L to −5 mg/L and −34 mg/L to −2 mg/L, respectively, are indicative that the phosphorous reduction progress was active for the first 3 hours ($\Delta$ TDS and $\Delta$ P more negative) but then slowed down as it reached the end point at hour 4 ($\Delta$ TDS and $\Delta$ P showing change of only −5 mg/L and −2 mg/L, respectively). In some other embodiments, the phosphorous level may be calculated based on the known relationship between the TDS level and phosphorous level.

FIG. 6 depicts a graphical example of the soluble phosphorous species reaction progress and end point in the aerobic phase of a fluctuating anaerobic-aerobic digester biosolids treatment process in a flow-through and/or SBR type operation. This is accomplished by monitoring the luxurious phosphorus uptake process and/or the reaction progress of the soluble phosphorous species with reactive ions including one or more alkali and/or alkaline-earth species and/or soluble metals species to form non-soluble phosphorous precipitate species by measuring the digester biosolids ionic activity using slope calculations of the soluble ionic concentration as a function of treatment cycle duration time.

Examples of these ions include but are not limited to calcium, magnesium, or other earth minerals. Other reactions of soluble phosphorous may form insoluble compounds such as phosphorous inorganic matter complexes, and could also impact the total phosphorous concentration in the digester biosolids. Embodiments described herein further monitor the overall effect of those other reactions on the measurements of the total concentration of soluble phosphorous.

The duration of the oxygenation phase for soluble phosphorous removal during the aerobic phase (and the initiation of a subsequent treatment phase) is determined from the slope of a plot of soluble calcium concentration as a function of treatment cycle duration. This slope calculation is used to calculate the reaction progress and end point for soluble phosphorous species reduction. Once the end point for soluble phosphorous reduction is reached, the soluble phosphorous species concentration can be determined by analysis using DIN EN ISO 6878:2004-09.

In various embodiments, the calcium ion concentration is monitored to assess the soluble phosphorus concentration; however, in other embodiments, any other earth mineral ions or soluble metal species could be used instead of calcium, such as magnesium. The concentration of these ions expresses the reaction progress of soluble phosphorous species by monitoring the luxurious phosphorus uptake process and/or the reaction progress of the soluble phosphorous species with reactive ions including one or more alkali and/or alkaline-earth species and/or soluble metals species to form non-soluble phosphorous precipitate species.

In the example embodiments described herein, the anaerobic biosolids treatment duration may be limited to keep the maximum ammonia concentration below a threshold such that it has no significant impact on the calcium values and slope calculations. If the ammonia concentration would be higher, then nitrifying acids which are produced during the nitrification process would react with the calcium ions and shift the slope of calcium reduction apart from the slope reduction of soluble phosphorous ions.

To limit the production of ammonium ions during the anaerobic treatment cycle, the anaerobic biosolids treatment cycle may be terminated once the ammonia concentration had reached 5 ppm. Other methods as previously described can be used for controlling the length of the anaerobic treatment cycle, which include time control, TDS control, ORP control, earth mineral and/or metal concentration control, water light absorbance and/or transmittance, water conductivity, water resistance/resistivity, and/or the water hardness concentration control.

With the concentration of ammonia limited, the major factor contributing to the reduction in calcium values during the subsequent aeration cycle is attributed to the reduction of concentration of soluble phosphorus species. Without significant concentrations of ammonia ions, the slope of calcium values closely follows the slope of soluble phosphorus concentrations. In this example, the calcium concentration directly correlates to the concentration of soluble phosphorus based on the known relationship between calcium and soluble phosphorus described previously.

In the aforementioned embodiments of this disclosure, the reaction progress of soluble phosphorous species reduction during the oxygenation phase of the digester treatment process is determined from the slope of a plot of soluble calcium concentration as a function of treatment cycle duration at one or more treatment progress steps in the digester treatment phase. The slope of a plot of soluble calcium concentration as a function of treatment cycle duration directly correlates to the reaction progress of soluble phosphorous species reduction.

Different characteristics in the types of changes of slope in a plot of soluble calcium concentration as a function of treatment cycle duration reflect changes in the reaction progress of soluble phosphorous species reduction. To determine the phosphorous species reduction reaction is nearing the end point, a plot of soluble calcium concentration as a function of treatment cycle duration must be negative (indicative of soluble phosphorous still actively reducing) and then show an inflection that decreases the slope (or nears a slope of zero). This is indicative of soluble phosphorous reduction slowing down or completely stopping.

Table 3, reproduced below, shows the characteristics of the soluble phosphorous species reaction progress with corresponding soluble calcium concentrations and plot slope calculations during the digester oxygenation phase illustrated in FIG. 6. Column 1 describes the aeration time of the digester oxygenation phase. Column 2 describes the soluble calcium concentration measurements taken at regular time intervals during the digester oxygenation phase. Column 3 describes the difference of the soluble calcium concentration measurement from the prior measurement (actual soluble calcium concentration measurements are shown in Column 2). Column 4 describes the soluble phosphorous species concentration measurements taken at regular time intervals during the digester oxygenation phase. The soluble phosphorous species measurements are determined by using a photometric colorimetric analyzer. Column 5 describes the difference of the soluble phosphorous species concentration measurement from the prior measurement (actual soluble phosphorous species concentration measurements are shown in Column 4).

TABLE 3

| Column 1 Aeration Time (hours) | Column 2 Calcium Concentration (mg/L) | Column 3 Δ Calcium Concentration (mg/L) | Column 4 P (mg/L) | Column 5 Δ P (mg/L) |
| --- | --- | --- | --- | --- |
| 0 | 380 | N/A | 75 | N/A |
| 1 | 260 | −120 | 52 | −23 |
| 2 | 150 | −110 | 30 | −22 |
| 3 | 80 | −70 | 17 | −13 |
| 4 | 50 | −30 | 13 | −4 |
| 5 | 34 | −16 | 10.5 | −2.5 |

In the table above, the soluble phosphorus reduction progress nears the end point after approximately 5 hours of the digester oxygenation. The Δ Calcium Concentration value is −16.0 mg/L at hour 5 and correlates to a Δ P value of −2.50 mg/L. The observable decreases in Δ Calcium Concentration and Δ P values from about −120 mg/L and −23 mg/L to −16.0 mg/L and −2.5 mg/L, respectively, are indicative that the soluble phosphorous reduction progress was active for the first 4 hours (Δ Calcium Concentration and Δ P are both more negative) but then slowed as it neared the end point by hour 5 (Δ Calcium Concentration and Δ P showing change of only −16 mg/L and −2.5 mg/L, respectively).

FIG. 7 depicts an example of how the ammonia reduction progress through nitrification and the soluble phosphorous species reaction progress and end point in the wastewater activated sludge sequencing batch reactor (SBR) by monitoring the ammonia reduction progress, the luxurious phosphorus uptake process and/or the reaction progress of the soluble phosphorous species with reactive ions including one or more alkali and/or alkaline-earth species and/or soluble metals species to form non-soluble phosphorous precipitate species is determined by calculations of the slope progress of the TDS concentration measurements as a function of treatment cycle duration. TDS slope progress is representative for all other ionic activity measurements (including but not limited to the earth mineral and/or metal concentration, water salinity, water light absorbance and/or transmittance, water conductivity concentration, the water resistance/resistivity concentration, and/or the water hardness concentration) and may be applied to various ionic activity measurement techniques.

Other reactions of soluble phosphorous may form insoluble compounds, such as phosphorous inorganic matter complexes and could also impact the total phosphorous concentration in the wastewater activated sludge process, but the embodiment of this invention described here would also be able to monitor the overall effect of those reactions on the total concentration of soluble phosphorous. The duration of the oxygenation phase during the aerobic stages (and the initiation of a subsequent treatment phase) is determined from the slope of a plot of TDS concentration as a function of treatment cycle duration to calculate the reaction progress and/or reaction end point for ammonia reduction through nitrification processes and or the reaction progress and/or reaction end point for soluble phosphorous species reduction.

In a preferred embodiment of this invention, the reaction progress of ammonia reduction through nitrification processes and soluble phosphorous species reduction during the oxygenation phase of the wastewater activated sludge sequencing batch process (SBR) is determined from the slope of a plot of TDS concentration as a function of treatment cycle duration at one or more treatment progress steps in the SBR activated sludge treatment phase.

The slope of a plot of TDS concentration as a function of treatment cycle duration correlates to the reduction of ammonia through nitrification processes and reaction progress of soluble phosphorous species reduction. Different characteristics in the types of changes that can be observed in the slope of a plot of TDS concentration as a function of treatment cycle duration reflect the changes in the reaction progress of ammonia reduction through nitrification and soluble phosphorous species reduction.

To determine the reaction is nearing the end point, the plot of TDS concentration as a function of treatment cycle duration must be negative (indicative of ammonia reduction and soluble phosphorous still actively reducing) and then show an inflection that decreases the slope to a target set point (indicative of soluble phosphorous reduction slowing down or stopping).

If at this point the oxygenation is continued, the slope of the plot of TDS concentration as a function of treatment cycle continues to decrease but at a reduced rate, which is an indicative that other biological reactions are reducing the ionic activity including ammonia reduction through nitrification without actively reducing soluble phosphorous.

If the slope progress shows a second inflection that decreases the slope (or the slope nears or reaches zero) and then increases, this is indicative of nitrification slowing down or stopping. After nitrification reaction progress has stopped an increase of the slope may be caused by generated nitrifying acids which react with insoluble earth minerals, and/or increase the concentration of nitrates that do not denitrify due to a lack of organic carbon which was reduced through aeration and is typically depleted once the ammonia concentration is close to 0 mg/L.

The table below shows the characteristics of ammonia reduction through nitrification and the soluble phosphorous species reaction progress with corresponding TDS concentrations and plot slope calculations during the activated sludge SBR oxygenation phase illustrated in FIG. 7.

Column 1 describes the aeration time of the activated sludge SBR oxygenation phase. Column 2 describes the TDS concentration measurements taken at 0.5-hour time intervals during the activated sludge SBR oxygenation phase. Column 3 describes the difference of the current TDS concentration measurement from the prior measurement (actual TDS concentration measurements are shown in Column 2). Column 4 describes the soluble phosphorous species concentration measurements taken at 0.5-hour time intervals during the activated sludge SBR oxygenation phase. The soluble phosphorous species concentration was determined by analysis using DIN EN ISO 6878:2004-09. Column 5 describes the difference of the current soluble phosphorous concentration measurement from the prior measurement (actual soluble phosphorous concentration measurements are shown in Column 4). Column 6 describes the ammonia concentration measurements taken at 0.5-hour time intervals during the activated sludge SBR oxygenation phase. The ammonia concentration was be determined by analysis using EPA METHOD 350.1. Column 7 describes the difference of the current ammonia concentration measurement from the prior measurement (actual ammonia concentration measurements are shown in Column 6). Column 8 describes the slope progress per hour of the TDS concentration. Column 9 describes the slope progress per hour of the soluble phosphorous concentration. Column 10 describes the slope progress per hour of the ammonia concentration.

In the table of FIG. 7 data is shown for TDS, phosphorous and ammonia concentration measurements taken as a function of activated sludge SBR oxygenation time. The rapid reduction of the values in the change in TDS (TDS slope) column during the initial 2.5 hours is indicative of when the soluble phosphorus reduction progress nears the end point, which is after approximately 2.5 hours of the oxygenation cycle.

Within those initial 2.5 hours, the TDS slope shows a negative trend that changes from −96 mg/L/hour to −30 mg/L/hour. The early rapid reduction in the TDS slope measurements correlates to the change in soluble phosphorous species concentration which also shows a rapid reduction mainly occurring up to the 2.5 hour time point. This is due to the reduction of soluble phosphorus approaching the end point (small amounts of soluble phosphorous are still present) and then being completed.

The reduction in the TDS slope measurements during the first 2.5 hours of the aeration cycle is also slightly affected by ammonia nitrification processes and/or denitrification processes which occur simultaneously during the initial 2.5 hours is indicative as the ammonia concentration in column 6 is reduced from 8 mg/L to 3 mg/L.

The observable decreases in the slope of both the TDS and soluble phosphorous species concentrations from about −96 mg/L/hour to −30 mg/L/hour and −2.0 mg/L/hour to −0.2 mg/L/hour, respectively, are indicative that the phosphorus reduction progress was active for the first 2.5 hours (TDS slope and P slope values are more negative) but then slowed as it progressed to the reaction end point after 2.5 hours (TDS slope and P slope only changing by −30 mg/L/hour and −0.2 mg/L/hour, respectively). Once the TDS slope values have decreased below a user specified set point (in the table presented here this value could be considered as −30 mg/L/hour) then soluble phosphorous reduction is completed and only ammonia reduction is occurring.

The effect of ammonia reduction still occurring after complete reduction of soluble phosphorous can be seen in FIG. 7 where the ammonia concentration is reduced at a rate of −2 mg/L/hour at the 2.5 hour time to −0 mg/L/hour at the 4 hour time. This correlates to a more gradual but measurable change in the TDS slope values for the same time range which change from −30 mg/L/hour to +30 mg/L/hour.

The slope of a plot of TDS concentration as a function of treatment cycle duration that is near zero is indicative that ammonia reduction is slowing down or stopping. If the slope of this same plot then becomes more positive it is indicative that other ionic species including nitrates are beginning to form that no longer denitrify due to a lack of soluble carbon once ammonia reduction is completed. Other ionic species like solubilized earth minerals can also increase the ionic species concentration. Depending on the site specific conditions during the treatment processes the competing reduction reactions of ammonia and phosphorous with soluble earth minerals can have an outcome of either ammonia or phosphorous being completely reduced first, but regardless either outcome is determined by site specific conditions which include but are not limited to the aeration rate.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Additionally, any modifications, although presently unforeseeable, to the present invention that come within the spirit and scope of the following claims should be considered part of the present invention.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed drawings have been described above, it should be understood that they have been presented by way of example only, and not limitation. Numerous changes, omissions, and/or additions to the subject matter disclosed herein can be made in accordance with the embodiments disclosed herein without departing from the spirit or scope of the embodiments.

Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Although operations of the controller 90, and other various systems described herein, may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including operations of the controller 90, that comprises software or code can be embodied in any non-transitory computer-readable medium for use by or in connection with an instruction execution system such as, for example, a hardware processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one sensor configured to obtain at least one measurement from wastewater;
   a controller configured to:
     determine a calculated slope progress of ionic activity of the wastewater as a function of treatment duration time using the at least one measurement obtained by the at least one sensor; and
     perform a wastewater treatment process based at least in part on the calculated slope progress of the ionic activity of the wastewater.

2. The system of claim 1, wherein the wastewater comprises at least one of: influent wastewater, waste activated sludge, primary sludge, and septage.

3. The system of claim 1, wherein the wastewater contains at least one pollutant, the at least one pollutant comprising at least one of: soluble or insoluble phosphorous species, soluble or insoluble nitrogen species, and soluble or insoluble carbon species.

4. The system of claim 1, wherein the wastewater treatment process comprises at least one of: aerobic, anaerobic, and anoxic treatment.

5. The system of claim 1, wherein the slope progress of ionic activity is determined by the controller as a function of at least one of: a rolling average, a standard deviation, a slope, global maxima, global minima, local maxima, and local minima.

6. The system of claim 1, wherein the controller is further configured to determine a duration of an aerobic oxygenation period and an amount of oxygenation to be performed in the wastewater treatment process using the slope progress of the ionic activity, the wastewater treatment process comprising an aerobic treatment phase.

7. The system of claim 1, wherein the slope progress of the ionic activity is used by the controller to determine a pollutant reduction reaction progress and an end point for at least one of:

a. soluble ammonia species reduction by a nitrification process;
b. soluble phosphorous species reduction by a luxurious phosphorus uptake process; and
c. soluble phosphorous species reduction by an earth mineral phosphorous precipitation process.

8. The system of claim 7, wherein the controller is further configured to determine, by monitoring the slope progress of a time resolved plot of the ionic activity as a function of treatment duration time, at least one of:
the pollutant reduction reaction progress and the end point of the nitrogen species pollutants by the nitrification process;
the pollutant reduction reaction progress and the end point of the phosphorous species pollutants by the luxurious phosphorus uptake process; and
the pollutant reduction reaction progress and the end point of the phosphorous species pollutants by earth mineral phosphorous precipitation process with reactive ions, the earth mineral phosphorous precipitation process comprising an alkali species, an alkaline-earth species, and a soluble metals species process.

9. The system of claim 6, wherein the slope progress of ionic activity is measured through at least one total dissolved solids (TDS) concentration measurement.

10. The system of claim 6, wherein the slope progress of ionic activity is measured through at least one of: a conductivity measurement; a salinity measurement; a water resistance measurement; a water hardness measurement; a light absorbance measurement; and a transmittance measurement.

11. A method, comprising:
controlling a wastewater treatment process by directly or indirectly monitoring a calculated slope progress of an ionic activity of wastewater as a function of treatment duration time.

12. The method of claim 11, wherein the wastewater comprises at least one of: influent wastewater, waste activated sludge, primary sludge, and septage.

13. The method of claim 11, wherein the wastewater contains at least one pollutant, the at least one pollutant comprising at least one of: soluble or insoluble phosphorous species, soluble or insoluble nitrogen species, and soluble or insoluble carbon species.

14. The method of claim 11, wherein the wastewater treatment process comprises at least one of: aerobic, anaerobic, and anoxic treatment.

15. The method of claim 11, wherein the slope progress of ionic activity is determined as a function of at least one of: a rolling average, a standard deviation, a slope, global maxima, global minima, local maxima, and local minima.

16. The method of claim 11, further comprising determining a duration of an aerobic oxygenation period and an amount of oxygenation to be performed in the wastewater treatment process using the slope progress of the ionic activity, the wastewater treatment process comprises an aerobic treatment phase.

17. The method of claim 11, wherein the slope progress of the ionic activity is used to determine a pollutant reduction reaction progress and an end point for at least one of:
a. soluble ammonia species reduction by a nitrification process;
b. soluble phosphorous species reduction by a luxurious phosphorus uptake process; and
c. soluble phosphorous species reduction by an earth mineral phosphorous precipitation process.

18. The method of claim 17, further comprising:
determining, by monitoring the slope progress of a time resolved plot of the ionic activity as a function of treatment duration time, at least one of:
the pollutant reduction reaction progress and the end point of the nitrogen species pollutants by the nitrification process;
the pollutant reduction reaction progress and the end point of the phosphorous species pollutants by the luxurious phosphorus uptake process; and
the pollutant reduction reaction progress and the end point of the phosphorous species pollutants by earth mineral phosphorous precipitation process with reactive ions, the earth mineral phosphorous precipitation process comprising an alkali species, an alkaline-earth species, and a soluble metals species process.

19. The method of claim 16, wherein the slope progress of ionic activity is monitored through at least one total dissolved solids (TDS) concentration measurement.

20. The method of claim 16, wherein the slope progress of ionic activity is monitored through at least one of: a conductivity measurement; a salinity measurement; a water resistance measurement; a water hardness measurement; a light absorbance measurement; and a transmittance measurement.

* * * * *